(12) United States Patent
Nakatomi et al.

(10) Patent No.: US 10,762,327 B2
(45) Date of Patent: Sep. 1, 2020

(54) IMAGE-PROCESSING DEVICE AND CELL OBSERVATION SYSTEM

(71) Applicant: OLYMPUS CORPORATION, Tokyo (JP)

(72) Inventors: Takayuki Nakatomi, Tokyo (JP); Satoshi Ishii, Tokyo (JP); Isao Sakane, Tokyo (JP); Masakazu Fujii, Tokyo (JP); Akira Matsushita, Tokyo (JP); Takashi Miyoshi, Kanagawa (JP)

(73) Assignee: OLYMPUS CORPORATION, Tokyo (JP)

( * ) Notice: Subject to any disclaimer, the term of this patent is extended or adjusted under 35 U.S.C. 154(b) by 122 days.

(21) Appl. No.: 16/048,792

(22) Filed: Jul. 30, 2018

(65) Prior Publication Data

US 2019/0095692 A1 Mar. 28, 2019

(30) Foreign Application Priority Data

Sep. 28, 2017 (JP) ................. 2017-187984

(51) Int. Cl.
*G06K 9/00* (2006.01)
*G06K 9/46* (2006.01)

(52) U.S. Cl.
CPC ......... *G06K 9/00147* (2013.01); *G06K 9/469* (2013.01)

(58) Field of Classification Search
None
See application file for complete search history.

(56) References Cited

U.S. PATENT DOCUMENTS

| 2003/0134269 | A1 | 7/2003 | Hirai et al. |
| 2012/0013727 | A1* | 1/2012 | Breniman ............. G02B 7/36 |
| | | | 348/79 |
| 2017/0044481 | A1 | 2/2017 | Kawano et al. |
| 2017/0261732 | A1 | 9/2017 | Takahashi et al. |
| 2017/0355949 | A1 | 12/2017 | Hirata et al. |
| 2018/0346956 | A1* | 12/2018 | Moriwaki ............. C12M 1/12 |
| 2019/0244349 | A1* | 8/2019 | Senda ................... C12M 1/34 |

FOREIGN PATENT DOCUMENTS

| EP | 3211469 A1 | 8/2017 |
| EP | 3279713 A1 | 2/2018 |
| JP | 2002-218995 A | 8/2002 |
| JP | 2015-210212 A | 11/2015 |
| WO | WO 2011/021391 A1 | 2/2011 |
| WO | WO 2015/174356 A1 | 11/2015 |
| WO | WO 2016/158780 A1 | 10/2016 |
| WO | WO 2016/158782 A1 | 10/2016 |

* cited by examiner

*Primary Examiner* — Dov Popovici
(74) *Attorney, Agent, or Firm* — Scully, Scott, Murphy & Presser, P.C.

(57) ABSTRACT

Provided is an image-processing device that includes: a processor including hardware; the processor configured to: analyze an image of the inside of a culture vessel that cultures cells, and acquire quantitative data of living cells and quantitative data of dead cells inside the culture vessel; and generate comparison data that allows comparison of the acquired quantitative data of the living cells and the acquired quantitative data of the dead cells.

14 Claims, 24 Drawing Sheets

FIG. 8

|  | POSITION | LIVING/DEAD |
|---|---|---|
| CELL 1 | (15, 40) – (55, 72) | LIVING |
| CELL 2 | (143, 42) – (177, 80) | DEAD |
| ⋮ | ⋮ | ⋮ |

FIG. 22

CULTURE LIST

| IDENTIFIER | INITIATION DATE/TIME | OPERATOR | TEMPERATURE | CO2 CONCENTRATION | CELL TYPE | CULTURE MEDIUM | CURRENT | PREDICTED | EVALUATION RESULT |
|---|---|---|---|---|---|---|---|---|---|
| CULTURE X | 2017/4/1 11:30 | A | 37°C | 5% | HUVEC | MMM PRODUCED BY COMPANY A | ACCEPTABLE | ACCEPTABLE | SATISFACTORY |
| CULTURE Y | 2017/4/9 13:25 | B | 37°C | 5% | HeLa | NNN PRODUCED BY COMPANY D | ACCEPTABLE | UNACCEPTABLE | UNSATISFACTORY |
| ... | ... | ... | ... | ... | ... | ... | ... | ... | ... |

IMAGE-PROCESSING DEVICE AND CELL OBSERVATION SYSTEM

CROSS-REFERENCE TO RELATED APPLICATIONS

This application claims the benefit of Japanese Patent Application No. 2017-187984, the content of which is incorporated herein by reference.

TECHNICAL FIELD

The present invention relates to an image-processing device and a cell observation system.

BACKGROUND ART

Reproducibility of experiments is sometimes an issue in experiments in which cultured cells are used. For example, differences in terms of the culturing date, the batch of cultured cells, the operator, and other factors have an effect, and identical experimental results may not be obtained even if cultured cells of the same type are used. Therefore, it is desirable that the quality of cells used in experiments be stable, and it is desirable to have an index for evaluating the quality. For example, a cultured cell evaluation device disclosed in PTL 1 classifies cells using morphological features of the cells as indexes, and evaluates deterioration of the cells.

CITATION LIST

Patent Literature

{PTL 1} PCT International Publication No. 2011/021391

SUMMARY OF INVENTION

One aspect of the present invention provides an image-processing device including: a processor including hardware, the processor configured to: analyze an image of the inside of a culture vessel that cultures cells, and acquire quantitative data of living cells and quantitative data of dead cells inside the culture vessel; and generate comparison data that allows comparison of the acquired quantitative data of the living cells and the acquired quantitative data of the dead cells.

Another aspect of the present invention provides a cell observation system including: a culture observation device that acquires an image of the inside of a culture vessel that cultures cells; a computer that is configured to: analyze the image acquired by the culture observation device, and acquire quantitative data of living cells and quantitative data of dead cells inside the culture vessel; and generate comparison data that allows comparison of the acquired quantitative data of the living cells and the acquired quantitative data of the dead cells; and a monitor that displays the generated comparison data.

BRIEF DESCRIPTION OF DRAWINGS

FIG. 8 is a diagram illustrating an example of data about the positions of cell regions detected by a cell-detecting unit.

FIG. 22 is a diagram illustrating an example of a database recorded by a recording unit of the cell observation system in FIG. 21.

DESCRIPTION OF EMBODIMENTS

First Embodiment

Figure 1:
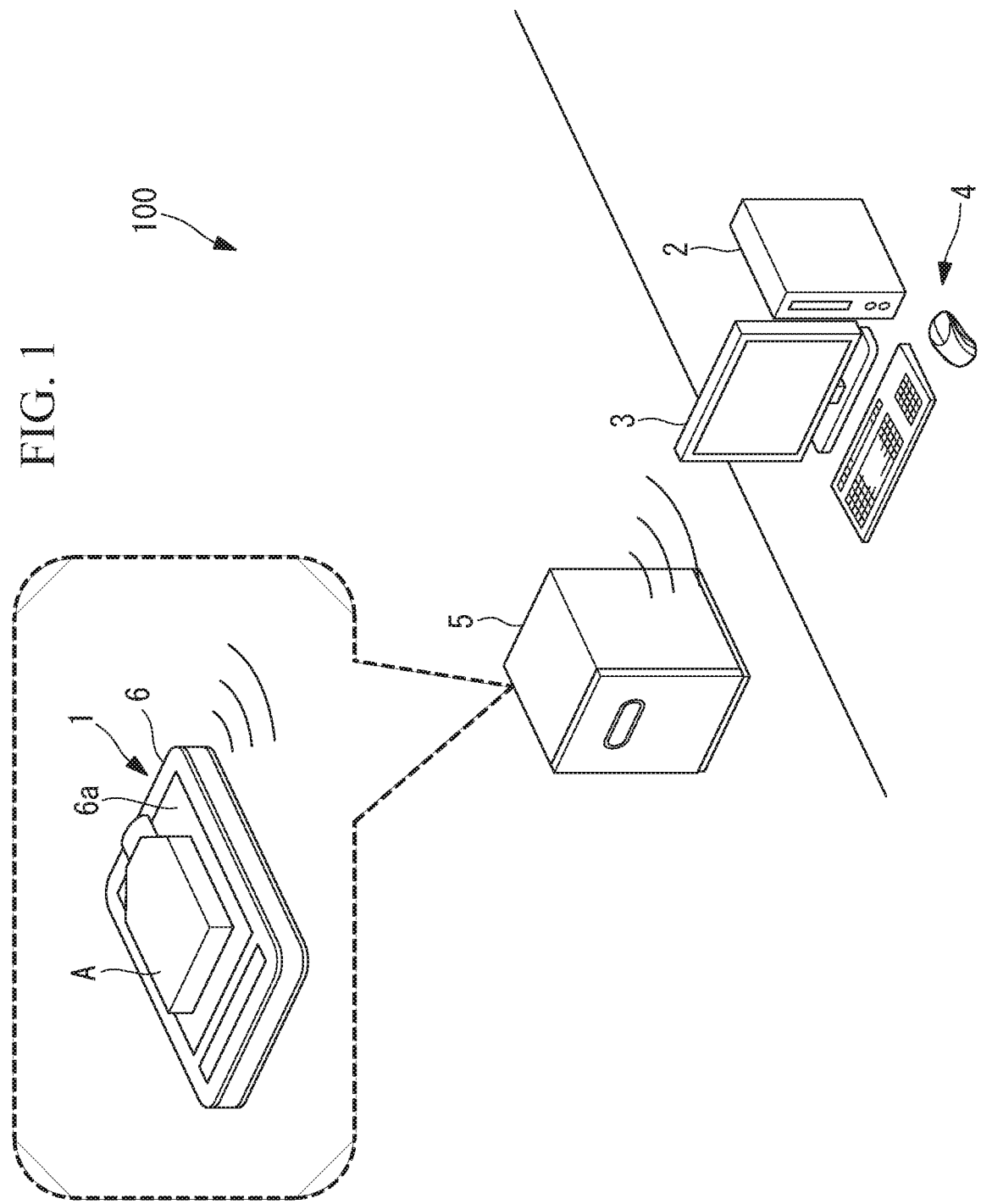
FIG. 1 is an external view illustrating the entire configuration of a cell observation system according to a first embodiment of the present invention.

A cell observation system 100 according to a first embodiment of the present invention will be described below while referring to the drawings.

As illustrated in FIG. 1, the cell observation system 100 according to this embodiment includes a culture observation device (image-acquiring unit) 1 that acquires an image of cells B inside a culture vessel A, a personal computer (PC) 2 that processes the image acquired by the culture observation device 1, a display unit 3 that displays the image acquired by the culture observation device 1, processing results generated by the PC 2, and so forth, and a display-switching unit 4 that switches the display of the display unit 3. Reference symbol 5 denotes an incubator.

Figure 2:
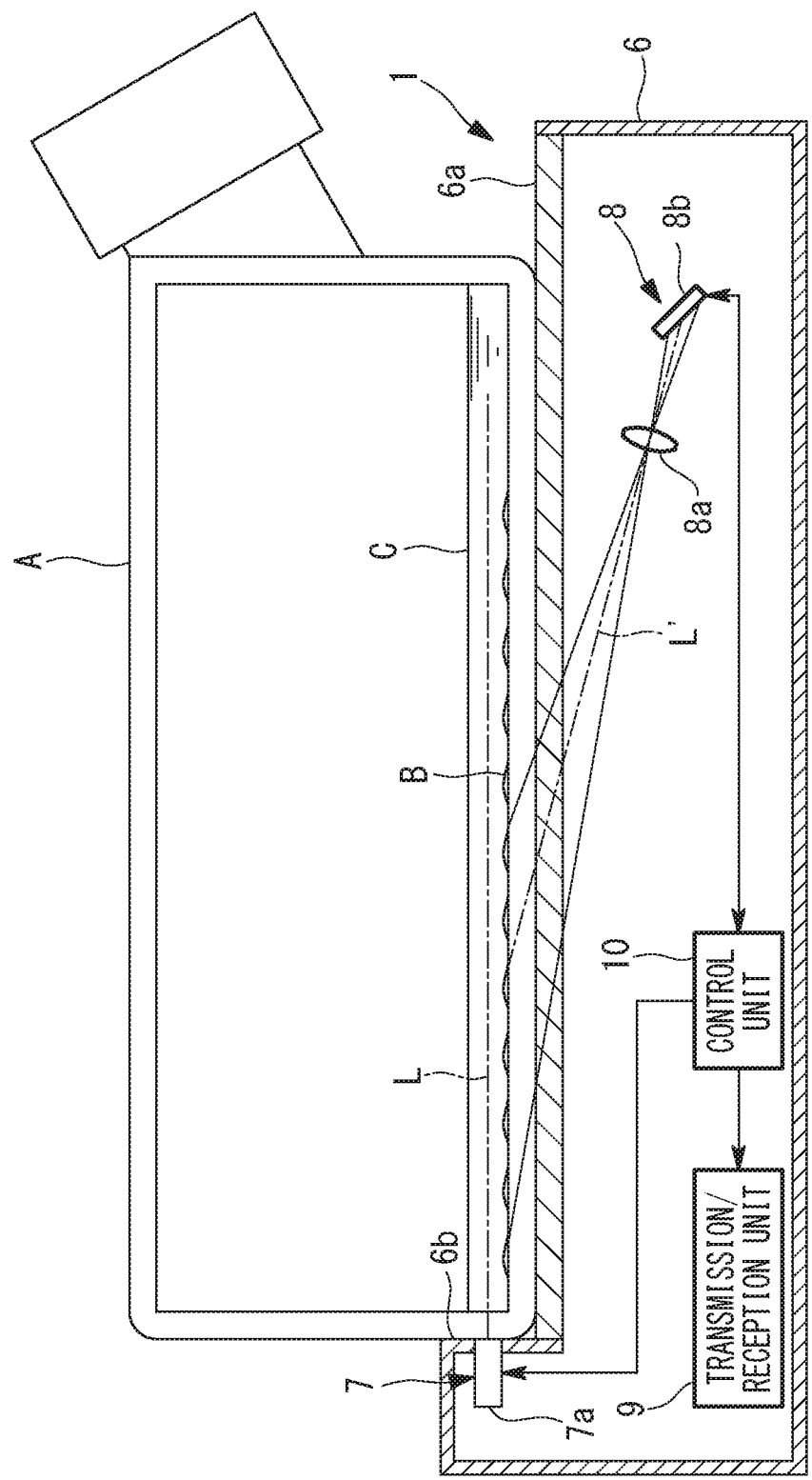
FIG. 2 is a vertical sectional view illustrating a culture observation device of the cell observation system in FIG. 1.

FIG. 2 illustrates an example of the culture observation device 1. As illustrated in FIG. 2, the culture observation device 1 includes a box-shaped base 6 on which the culture vessel A is mounted, a light source unit 7 that is provided inside the base 6, an image-capturing unit 8, a transmission/reception unit 9, and a control unit 10.

The culture vessel A is a flask for culturing cells and is formed of an optically transparent material, for example.

The base 6 has a flat mounting surface 6a that a lower surface of the culture vessel A closely contacts and that is composed of an optically transparent material, and an abutting surface 6b that stands upright from the mounting surface 6a and which one side surface of the culture vessel A on the mounting surface 6a closely contacts. The inside of the incubator 5 is under a high-humidity condition, and therefore the base 6 has a waterproof structure.

The light source unit 7 is arranged on the abutting surface 6b, and includes a plurality of LED light sources 7a that are spaced apart from the mounting surface 6a by a prescribed spacing, and that are arrayed in a direction parallel to the mounting surface 6a. Illumination light L is emitted substantially parallel to the mounting surface 6a from each LED light source 7a, and the illumination light L enters the inside of the culture vessel A from a side surface of the culture vessel A in a direction along a bottom surface of the culture vessel A. Consequently, the cells B, which are adhered to the bottom surface of the culture vessel A, are illuminated from the side and shadows of the cells B are formed as in the case of oblique illumination or dark-field illumination.

The image-capturing unit 8 includes a light-collecting lens 8a that is arranged below the mounting surface 6a, and an image-capturing element 8b that is arranged at an image-forming position of the light-collecting lens 8a and acquires an image by photographing the light collected by the light-collecting lens 8a. Part of scattered light L' that is scattered by the cells B passes through the bottom surface of the culture vessel A and the mounting surface 6a, is collected by the light-collecting lens 8 and photographed by the image-capturing element 8b. A movement mechanism (not illustrated) such as a linear actuator that causes the image-capturing unit 8 to be moved in a direction parallel to the mounting surface 6a is provided inside the base 6, and the photographing position of the image captured by the image-capturing unit 8 can be changed by operating the movement mechanism.

The transmission/reception unit 9 transmits and receives data and signals by wirelessly communicating with the PC 2, which is arranged outside the incubator 5.

The control unit 10 receives a control signal from the PC 2 via the transmission/reception unit 9, and controls the light source unit 7 and the image-capturing unit 8 in accordance with the control signal. For example, the control unit 10 includes a timer (not illustrated) that counts time, and the control unit 10 controls the light source unit 7 and the image-capturing unit 8 such that an image is acquired at a photographing position set at a photographing time set by an operator.

Figure 3:
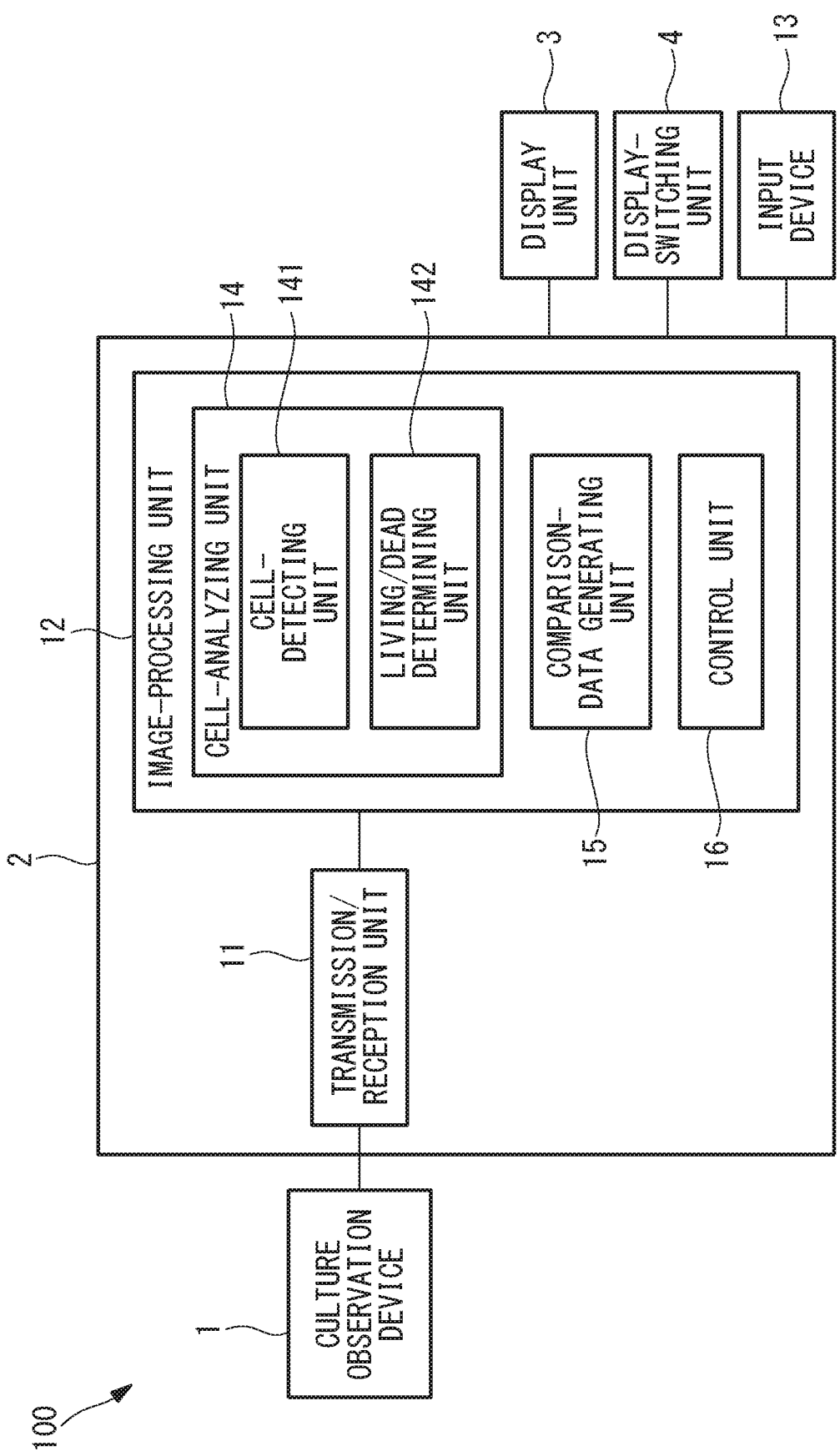
FIG. 3 is a block diagram illustrating the entire configuration of the cell observation system in FIG. 1.

As illustrated in FIG. 3, the PC 2 includes a transmission/reception unit 11 that wirelessly communicates with the transmission/reception unit of the culture observation device 1, an image-processing unit (image-processing device) 12 that processes an image acquired by the culture observation device 1, and an input device 13 such as a keyboard and a mouse.

The image-processing unit 12 includes a cell-analyzing unit 14 that analyzes the image acquired by the culture observation device 1 and acquires quantitative data of living cells and quantitative data of dead cells inside the culture vessel A, a comparison-data generating unit 15 that generates comparison data that allows comparison of the quantitative data of the living cells and the quantitative data of the dead cells acquired by the cell-analyzing unit 14, and a control unit 16. The image-processing unit 12 is implemented by software that is installed in the PC 2, and that is programmed such that a CPU (central arithmetic processing device) is made to execute processing that is described later.

The cell-analyzing unit 14 includes a cell-detecting unit 141 that detects cell regions within an image, and a living/dead determining unit 142 that determines whether the cells B in the cell regions detected by the cell-detecting unit 141 are living or dead.

The cell-detecting unit 141 detects cell regions that include the cells B and the positions, within the image, of the cell regions by, for example, performing template matching or the like using preset cell template images. The cell regions are rectangular or circular regions in which the cells B are inscribed, for example.

The living/dead determining unit 142 determines whether the cells B inside the cell regions detected by the cell-detecting unit 141 are living or dead. For example, the method disclosed in Japanese Unexamined Patent Application Publication No. 2015-210212 is used in order to determine whether the cells B are living or dead. Next, the living/dead determining unit 142 counts the number of living cells, the number of dead cells, and the total number of cells on the basis of the determination results. In addition, the living/dead determining unit 142 calculates the ratio of the number of living cells to the total number of cells and the ratio of the number of dead cells to the total number of cells.

The analysis results generated by the cell-analyzing unit 14 (i.e., the cell regions and the positions of the cell regions, the number of living cells, the number of dead cells, and the total number of cells, and the ratios of the number of living cells and the number of dead cells) are transmitted to the comparison-data generating unit 15.

Figure 4:
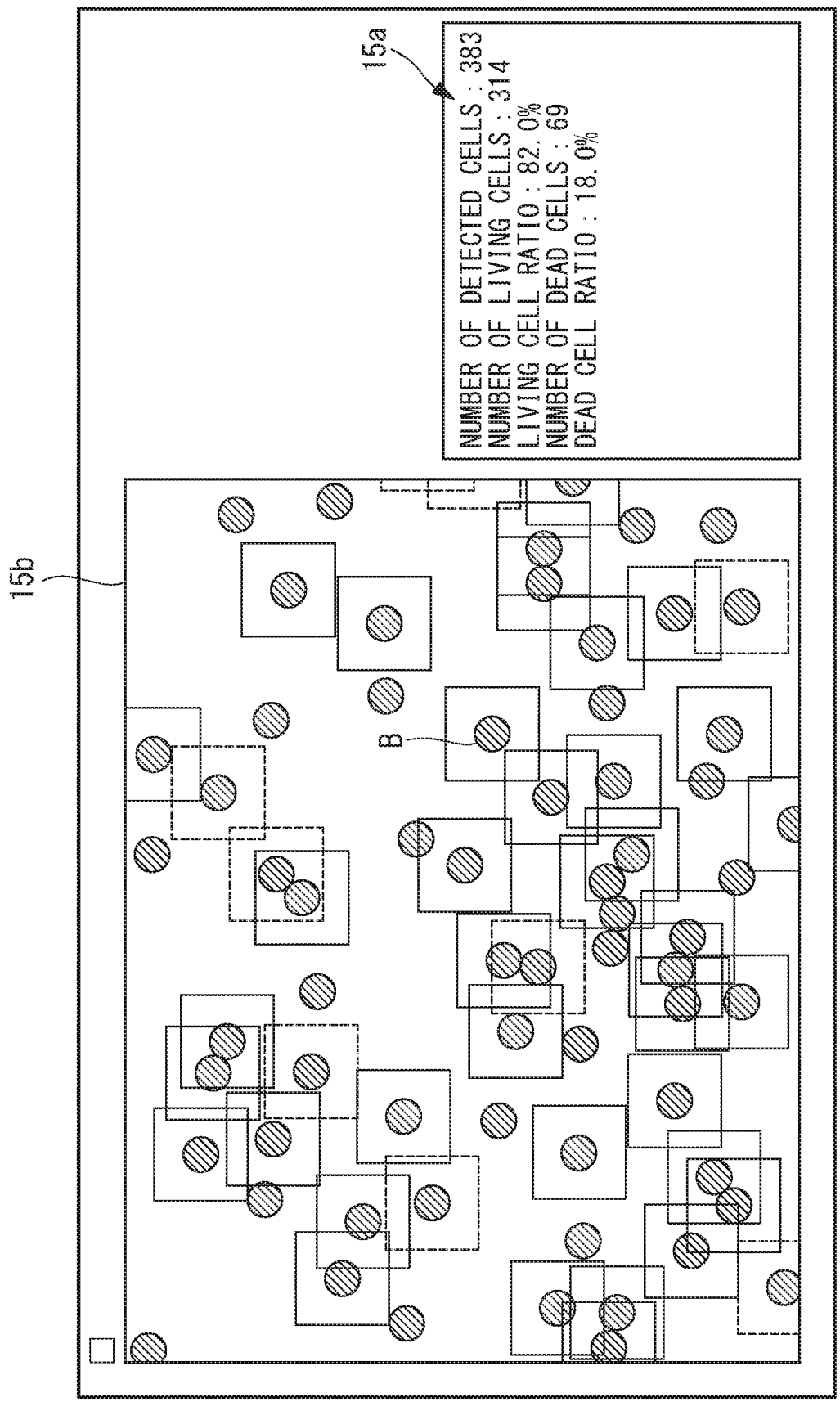
FIG. 4 is a diagram illustrating an example of comparison data displayed on a display unit of the cell observation system in FIG. 1.

From the analysis results generated by the cell-analyzing unit 14, the comparison-data generating unit 15 generates display-formatted comparison data that allows an operator to easily compare the numbers and ratios of living cells and dead cells. For example, as illustrated in FIG. 4, the comparison-data generating unit 15 generates, as comparison data, a numerical display 15a consisting of the number of living cells, the ratio of the number of living cells to the total number of cells, the number of dead cells, and the ratio of the number of dead cells to the total number of cells. In addition, the comparison-data generating unit 15 generates a composite image 15b in which markers having different display forms depending on whether a cell is a living cell or a dead cell are superposed on an image. In FIG. 4, a rectangular solid line that encloses a living cell and a rectangular broken line that encloses a dead cell are illustrated as examples of the markers. The comparison-data generating unit 15 transmits the generated comparison data and composite image to the display unit 3 and causes the generated comparison data and composite image to be displayed on the display unit 3.

The control unit 16 controls the culture observation device 1 by transmitting, to the culture observation device 1 via the transmission/reception unit 11, a control signal for causing photographing to be executed at a photographing position set at a set photographing time. The photographing time and photographing position are set by an operator using the input device 13.

The display unit 3 is a display device such as a liquid crystal monitor and is connected to the PC 2. The display unit 3 displays the comparison data and the composite image received from the comparison-data generating unit 15. The display-switching unit 4 is, for example, composed of the input device 13 and is configured such that the operator can switch the comparison data displayed on the display unit 3 using the input device 13.

Figure 5:
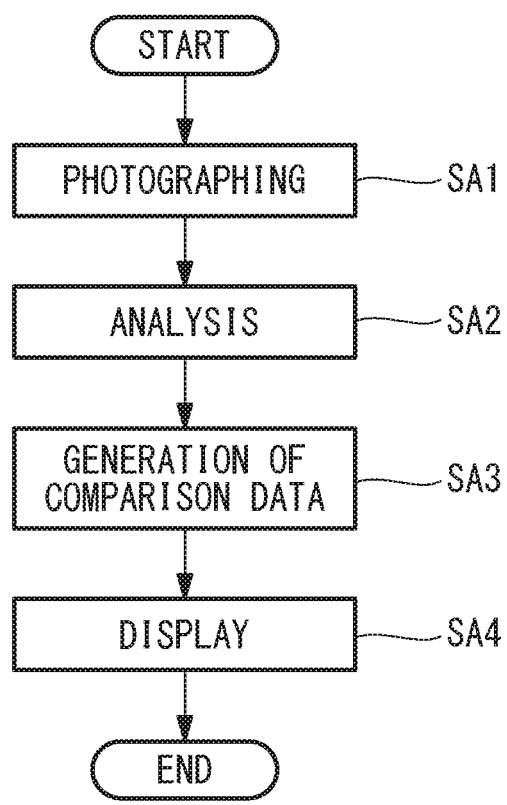
FIG. 5 is a flowchart illustrating operation of the cell observation system in FIG. 1.

Next, the operation of the thus-configured cell observation system 100 will be described while referring to FIG. 5.

In order to observe the culturing condition of the cells B using the cell observation system 100 according to this embodiment, the culture vessel A in which the cells B and a culture medium C are accommodated is mounted on the base 6 such that the lower surface of the culture vessel A closely contacts the mounting surface 6a. The culture observation device 1 on which the culture vessel A is mounted in this state is arranged inside the incubator 5 such that the mounting surface 6a is horizontal, and culturing of the cells B inside the culture vessel A is initiated in an environment in which the temperature and humidity inside the incubator 5 are controlled.

Once culturing has been initiated, the photographing time and photographing position are set by the operator using the input device 13. The control unit 16 generates a control signal based on the set photographing time and photographing position, and transmits the control signal to the control unit 10 of the culture observation device 1 via the transmission/reception units 11 and 9. The control unit 10 causes the light source unit 7 to operate and causes the image-capturing element 8b to execute photographing when the photographing time is reached (step SA1). The image acquired by the image-capturing element 8b is transmitted to the image-processing unit 12 inside the PC 2 from the culture observation device 1 via the transmission/reception units 9 and 11.

Next, analysis of the image (step SA2) and generation of comparison data (step SA3) are executed in the cell-analyzing unit 14 of the image-processing unit 12.

Specifically, cell regions within the image and the positions of the cell regions are detected by the cell-detecting unit 141, and then it is determined whether the cell B inside each cell region is living or dead and the number of living cells, the number of dead cells, the total number of cells, the ratio of the number of living cells to the total number of cells, and the ratio of the number of dead cells to the total number of cells are calculated as quantitative data by the living/dead determining unit 142 (step SA2). Next, comparison data that allows comparison of the numbers and ratios of the living cells and the dead cells is generated by the comparison-data generating unit 15 (step SA3).

The generated comparison data is transmitted to the display unit 3, and as illustrated in FIG. 4, the comparison data is displayed on the display unit 3 (step SA4). The operator can evaluate the condition of the cells B currently being cultured inside the culture vessel A on the basis of the comparison data displayed on the display unit 3.

Figure 6A:
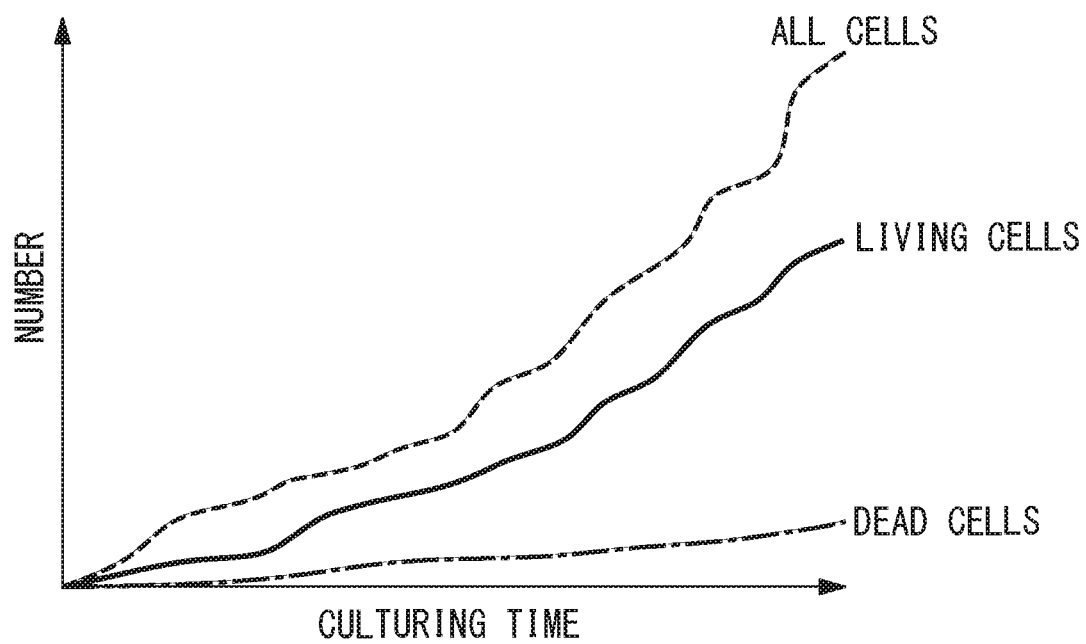
FIG. 6A depicts graphs illustrating changes in the number of living cells and the number of dead cells over time where the condition of the cells is satisfactory.
Figure 6B:
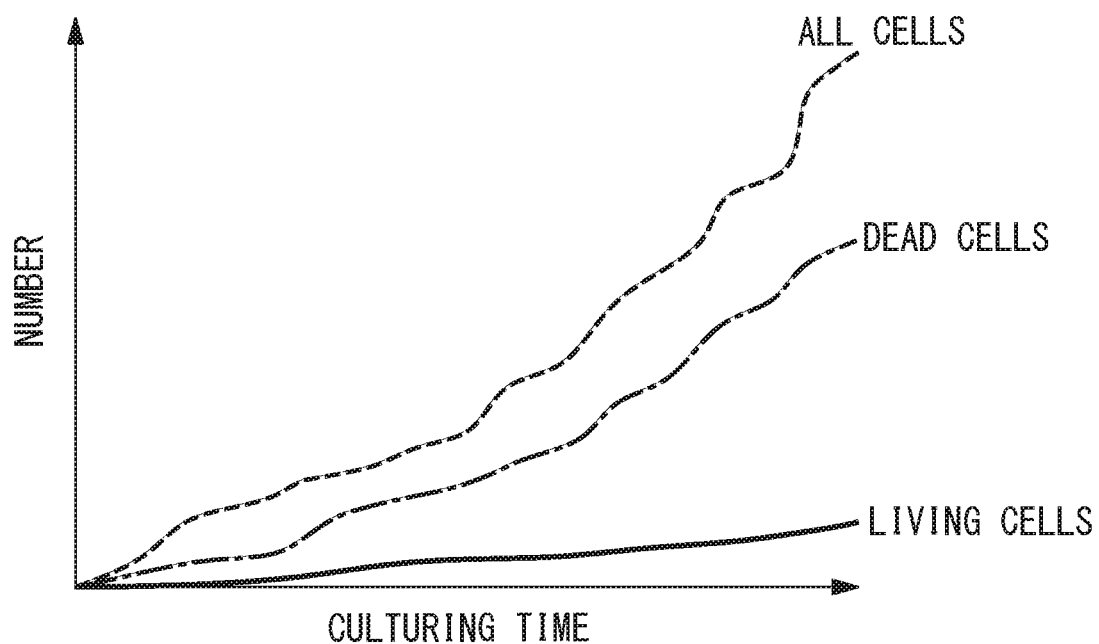
FIG. 6B depicts graphs illustrating changes in the number of living cells and the number of dead cells over time where the condition of the cells is unsatisfactory.

The condition of the cells B being cultured cannot be grasped from only the total number of cells inside the culture vessel A. FIGS. 6A and 6B illustrate examples of cell growth curves. In addition to the number of living cells, the number of dead cells is also included in the total number of cells, and the condition of the cells may be satisfactory (refer to FIG. 6A) or the condition of the cells may be unsatisfactory (refer to FIG. 6B) even when the total number of cells is the same. Therefore, it is necessary to compare the living cells and the dead cells included in the group of cells inside the culture vessel A in order to evaluate the condition of the cells B.

According to this embodiment, the operator can easily evaluate the condition of the cells B being cultured by comparing the numbers and ratios of living cells and dead cells included in the group of cells inside the culture vessel A on the basis of the comparison data displayed on the display unit 3. Therefore, the operator can perform experiments with high reproducibility by evaluating the condition of the cells B prior to performing an experiment and using only cells B having a constant quality in the experiment. In addition, it is possible to generate comparison data that allows the condition of the cells B to be evaluated through simple analysis processing of merely counting the number of living cells and the number of dead cells within an image.

In this embodiment, the cell-analyzing unit 14 may acquire distributions in addition to or instead of the numbers and ratios as the quantitative data of the living cells and the dead cells.

Figure 7:
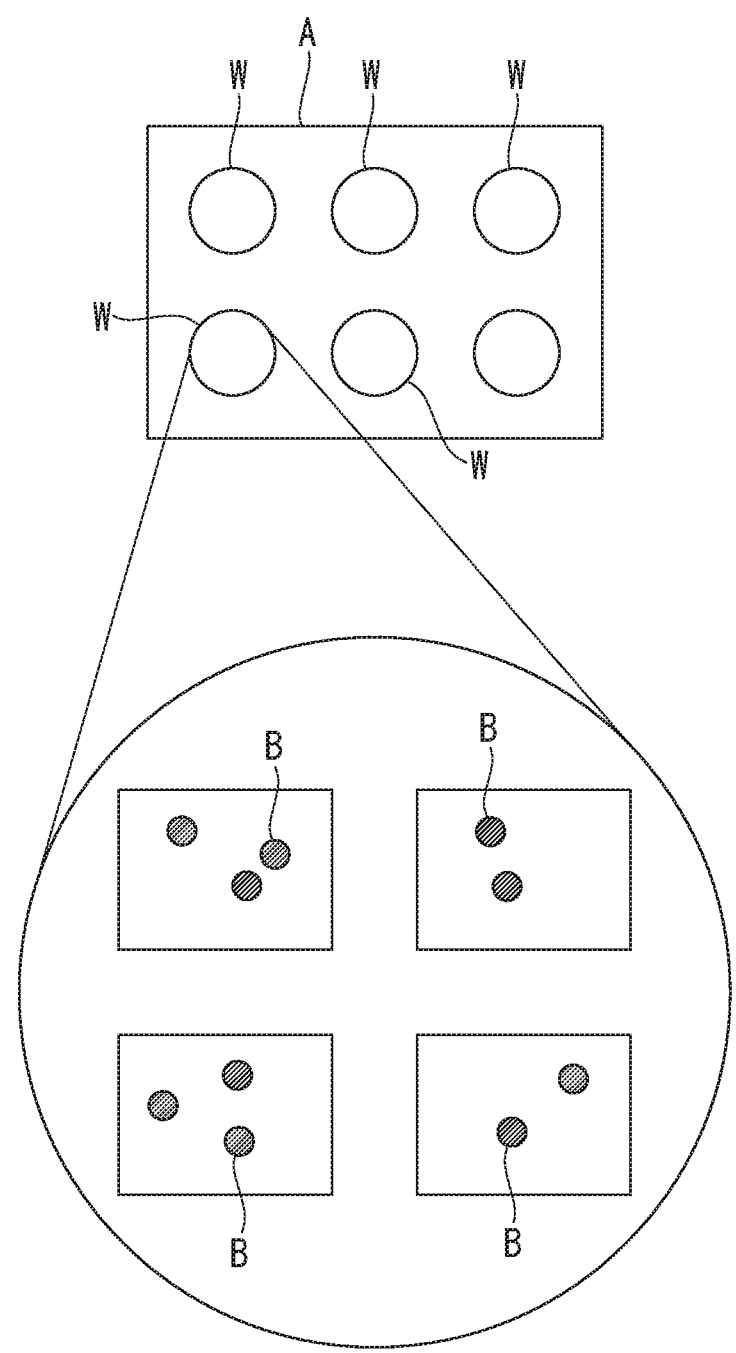
FIG. 7 is a diagram for explaining a photographing position when a multiwell plate is used.

For example, as illustrated in FIG. 7, a multiwell plate may be used as the culture vessel A, images may be acquired at a plurality of photographing positions inside respective wells W, the number of living cells and the number of dead cells may be counted in each of the plurality of images, and the distribution or standard deviation of each of the numbers of living cells and the numbers of dead cells may be calculated.

Furthermore, in this embodiment, the spatial distributions of the living cells and the dead cells may be evaluated on the basis of the positions of the cell regions detected by the cell-detecting unit 141.

As illustrated in FIG. 8, the cell-detecting unit 141 also detects the positions of the cell regions at the same time as detecting the cell regions. In the case where the cell regions are rectangular, a cell region and the position of the cell region are represented by the top left and bottom right coordinates of the rectangle, for example. In the case where the cell regions are circular, a cell region and the position of the cell region may be represented by the coordinates of the center of the circle and the radius of the circle.

The spatial distributions of the living cells and the dead cell inside each well W are obtained from the plurality of cell regions and the positions of the cell regions detected by the cell-detecting unit 141. Therefore, for example, the operator is able to grasp a region that has a large number of dead cells and a region that has a high growth rate in each well W, and can compare the distributions of living cells and dead cells between the plurality of wells W.

Second Embodiment

Next, a cell observation system 200 according to a second embodiment of the present invention will be described while referring to the drawings.

In this embodiment, the parts of the configuration that are different from the first embodiment are described, the parts of the configuration that are common to the first embodiment are denoted by the same reference symbols, and a description thereof is omitted.

The cell observation system 200 according to this embodiment differs from the first embodiment in that images of the inside of the culture vessel A are acquired over time, quantitative data acquired from the images is recorded in time series, and the changes that occur in the quantitative data over time are displayed on the display unit 3.

Figure 9:
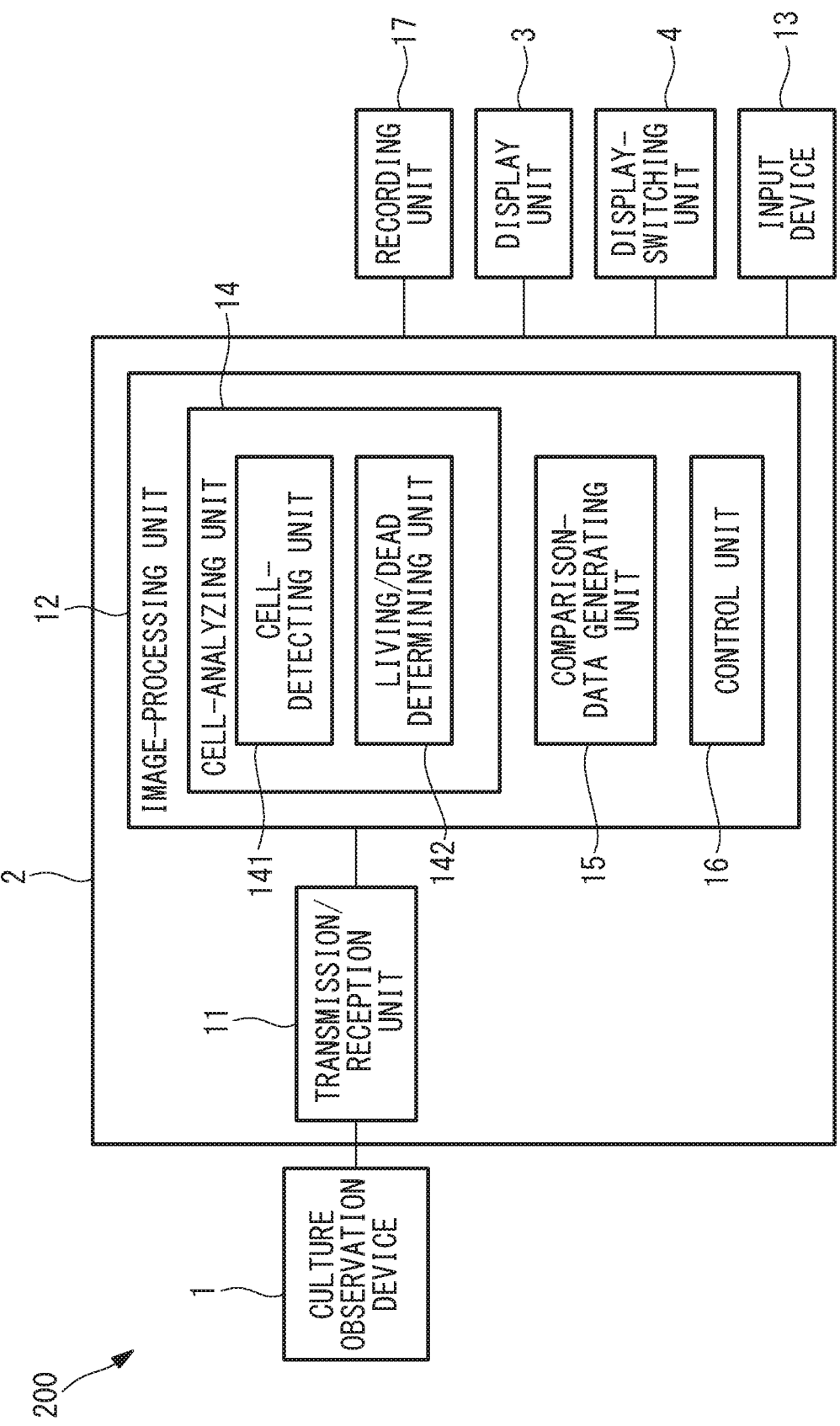
FIG. 9 is a block diagram illustrating the entire configuration of a cell observation system according to a second embodiment of the present invention.

As illustrated in FIG. 9, the cell observation system 200 includes the culture observation device 1, the PC 2, the display unit 3, the display-switching unit 4, and a recording unit 17 that records images acquired by the culture observation device 1 and analysis results generated by the cell-analyzing unit 14.

In this embodiment, identifiers, photographing intervals, and photographing positions are set by the operator using the input device 13. Each identifier is for identifying a series of cultures. The control unit 16 controls the culture observation device 1 by transmitting, to the culture observation device 1 via the transmission/reception unit 11, a control signal for causing photographing to be executed at photographing positions set at a set photographing interval.

Figure 10:
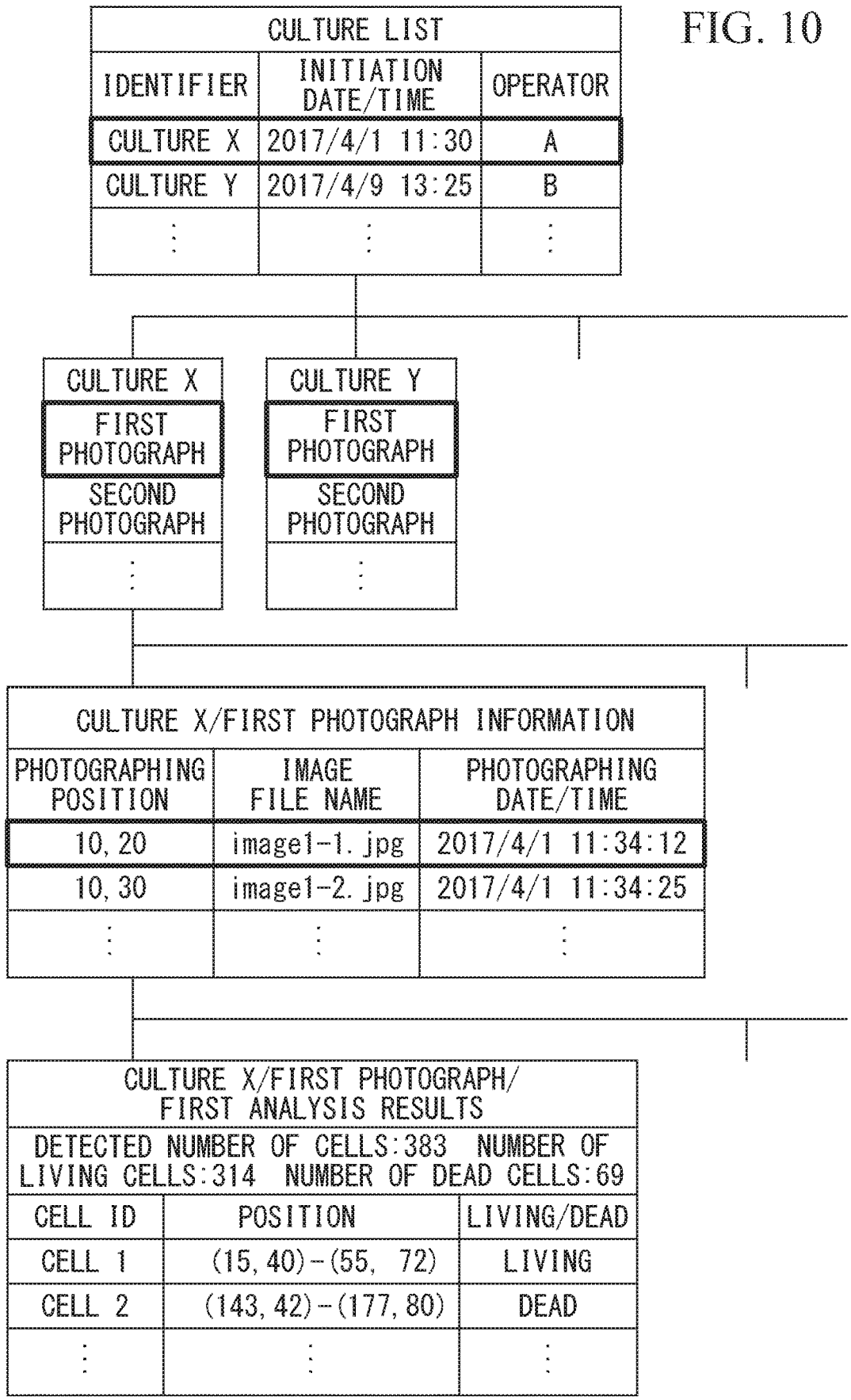
FIG. 10 is a diagram illustrating an example of a database recorded by a recording unit of the cell observation system in FIG. 9.

The recording unit 17 is a recording device externally attached to the PC 2, for example. The recording unit 17 receives images acquired by the culture observation device 1 and analysis results generated by the cell-analyzing unit 14 from the image-processing unit 12 inside the PC 2, and records the images and analysis results in time series in association with the identifiers and photographing dates/times. Thus, as illustrated in FIG. 10, a database is created in the recording unit 17 in which identifiers, photographing initiation dates/times, photographing positions, photographing times, and analysis results are associated with one another. Every time culturing is performed, information regarding the culture is added to the database. Therefore, analysis results for past and current cultures accumulate in the database in the recording unit 17. The recording unit 17 may be a storage device built into the PC 2, and images and quantitative data may be transmitted and received inside the PC 2.

In this embodiment, the comparison-data generating unit 15 generates a list of cultures in which analysis results are recorded in the database and causes the list of cultures to be displayed on the display unit 3. The operator can select, from the list of cultures displayed on the display unit 3, a culture that he/she wishes to check the analysis results of by using the input device 13 at a desired timing.

Figure 11:
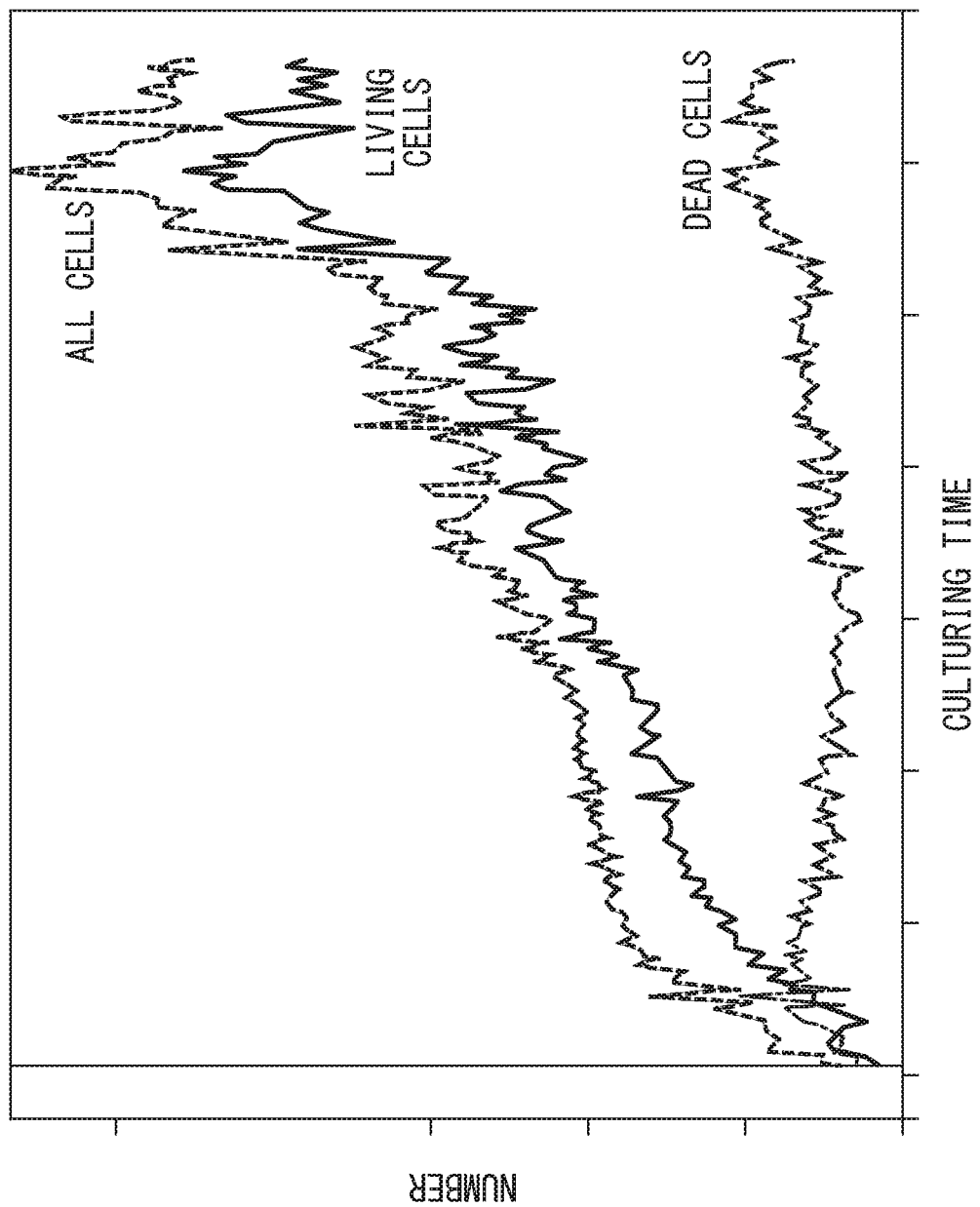
FIG. 11 is a diagram illustrating an example of comparison data generated by a comparison-data generating unit of an image-processing unit in FIG. 9.

When any one of the cultures is selected by the operator, the comparison-data generating unit 15 reads the analysis results of the selected culture out from the database of the recording unit 17, and generates, from the read-out analysis results, display-formatted comparison data that allows the operator to easily compare the changes in the quantitative data of the living cells over time and the changes in the quantitative data of the dead cells over time. For example, as illustrated in FIG. 11, the comparison-data generating unit 15 generates comparison data in which a graph of the changes in the number of living cells over time and a graph of the changes in the number of dead cells over time are superposed on each other. The comparison-data generating unit 15 transmits the generated comparison data to the display unit 3 and causes the generated comparison data to be displayed on the display unit 3.

Figure 12:
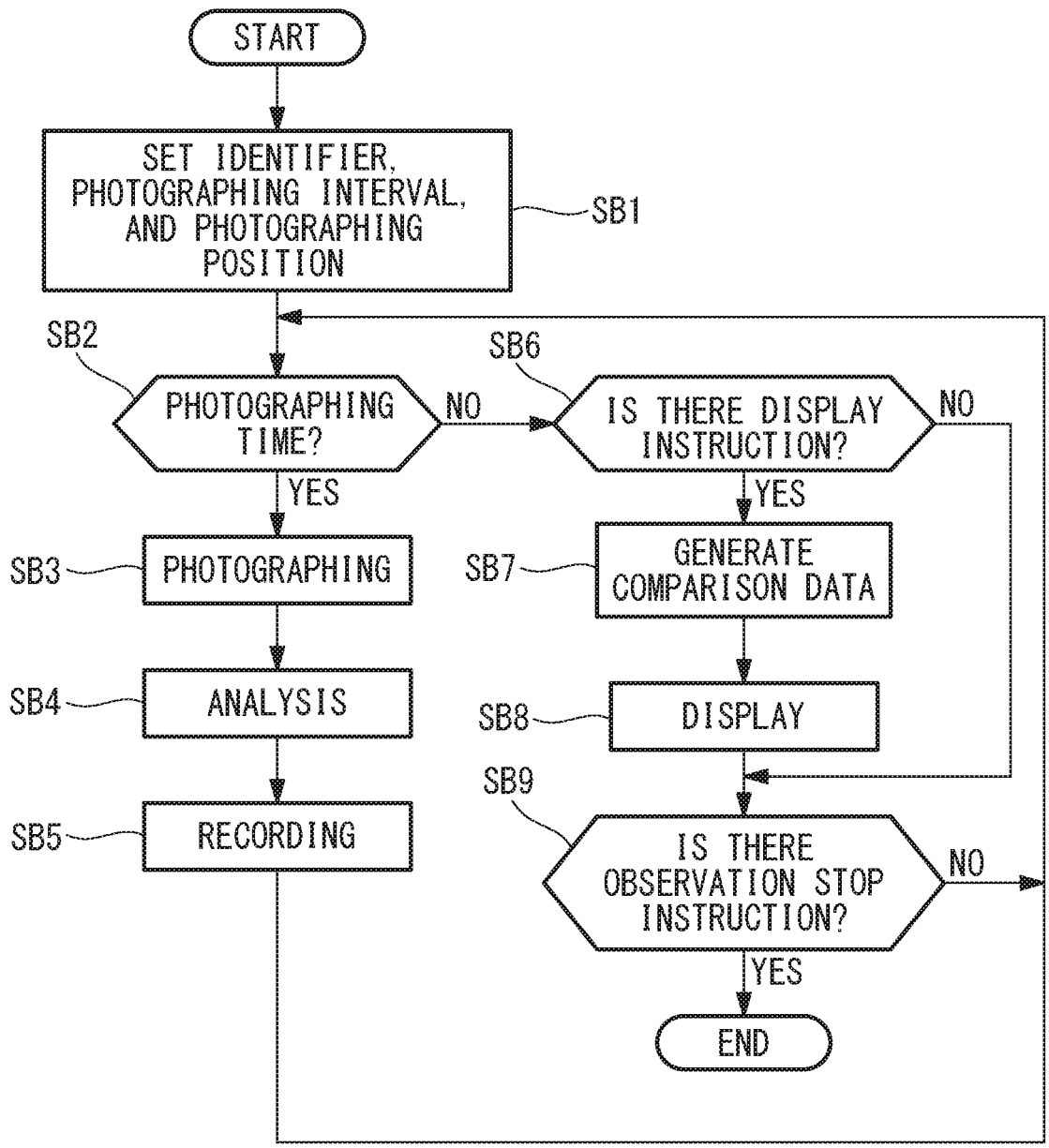
FIG. 12 is a flowchart illustrating the operation of the cell observation system in FIG. 9.

Next, the operation of the thus-configured cell observation system 200 will be described while referring to FIG. 12.

Similarly in the first embodiment, once culturing of the cells B inside the culture vessel A has been initiated, the operator sets an identifier, a photographing interval, and a photographing position using the input device 13 (step SB1). The control unit 16 generates a control signal based on the set photographing interval and photographing position, and transmits the control signal to the control unit 10 of the culture observation device 1 via the transmission/reception units 11 and 9.

The control unit 10 causes the light source unit 7 to operate by the set photographing interval (step SB2) and causes the image-capturing element 8b to execute photographing (step SB3). The image acquired by the image-capturing element 8b is transmitted to the image-processing unit 12 inside the PC 2 from the culture observation device 1 via the transmission/reception units 9 and 11. Next, analysis of the image is executed in the cell-analyzing unit 14 of the image-processing unit 12 (step SB4), and the analysis results are recorded in the database of the recording unit 17 in association with the photographing time and the image (step SB5).

When the operator wishes to check the condition of the cells B currently being cultured, the operator selects the current culture from the list of cultures displayed on the display unit 3. Once the operator has selected the current culture (YES in step SB6), the analysis results of the current culture acquired thus far are read out from the recording unit 17 to the comparison-data generating unit 15, and comparison data that allows changes in the quantitative data of the living cells and the dead cells over time to be compared with each other is generated by the comparison-data generating unit 15 (step SB7). The generated comparison data is displayed on the display unit 3 (step SB8). {0039}

The operator evaluates the condition of the cells B currently being cultured inside the culture vessel A on the basis of the comparison data displayed on the display unit 3, and determines whether to continue or stop the culturing. In other words, the culturing is continued in the case where the condition of the cells B being cultured is satisfactory but the number of such cells is insufficient (NO in step SB9). On the other hand, in the case where the condition of the cells B being cultured is unsatisfactory or the number of satisfactory cells B has increased to a sufficient number, observation using the culture observation device 1 and culturing of the cells B are stopped (YES in step SB9).

In addition, when the operator wishes to refer to the comparison data of past cultures, the operator can cause the comparison data of the past cultures to be displayed on the display unit 3 by selecting any one of the past cultures from the list of cultures displayed on the display unit 3.

Thus, according to this embodiment, the operator is able to grasp changes in the number of living cells and the number of dead cells in a group of cells inside the culture vessel A on the basis of the comparison data displayed on the display unit 3. Therefore, the operator can perform experiments with higher reproducibility by more accurately evaluating the condition of the cells B prior to performing an experiment and using only cells B having a constant quality in the experiment. In addition, comparison data can be generated that allows the condition of the cells B to be more accurately evaluated through simple analysis processing of merely displaying the recorded quantitative data in time series.

In this embodiment, graphs depicting the changes in the number of living cells and the number of dead cells over time have been exemplified as the comparison data generated by the comparison-data generating unit 15, but the comparison data is not limited to this example. FIGS. 13 to 20 illustrate other examples of the comparison data.

Figure 13:
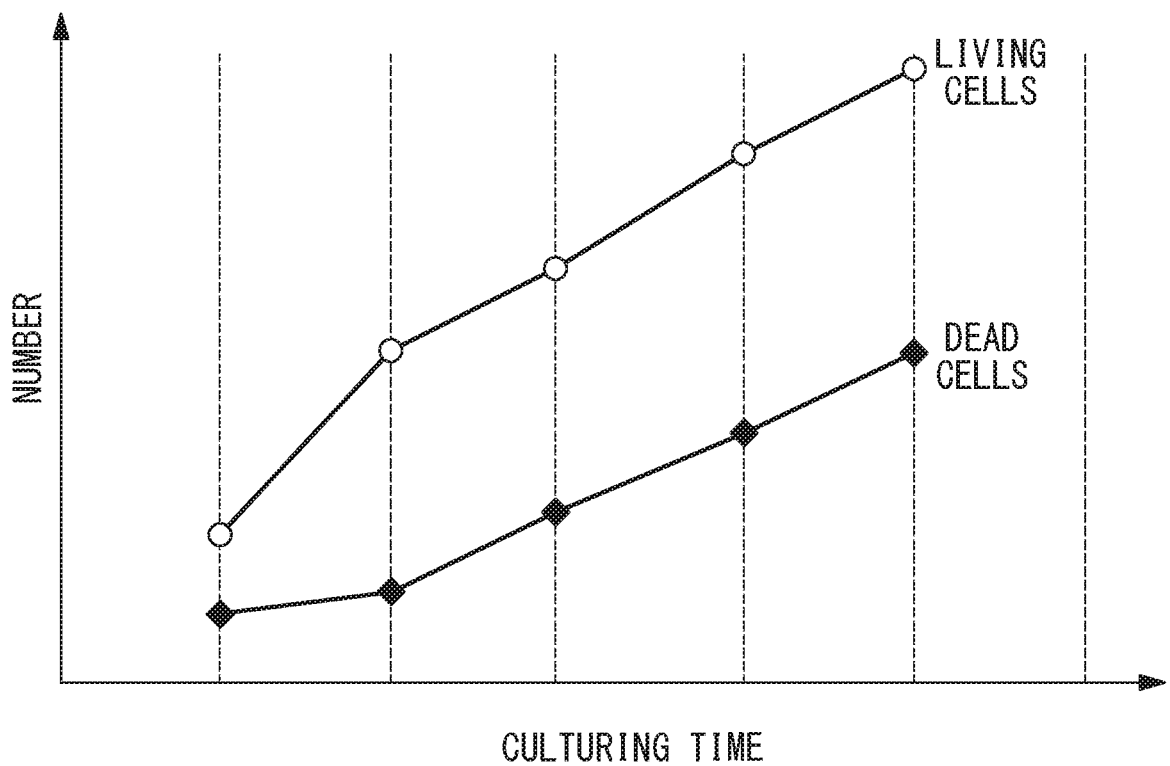
FIG. 13 is a diagram illustrating another example of comparison data generated by the comparison-data generating unit of the image-processing unit in FIG. 9.

The comparison data in FIG. 13 consists of graphs depicting changes in the cumulative number of living cells and the cumulative number of dead cells over time.

Figure 14:
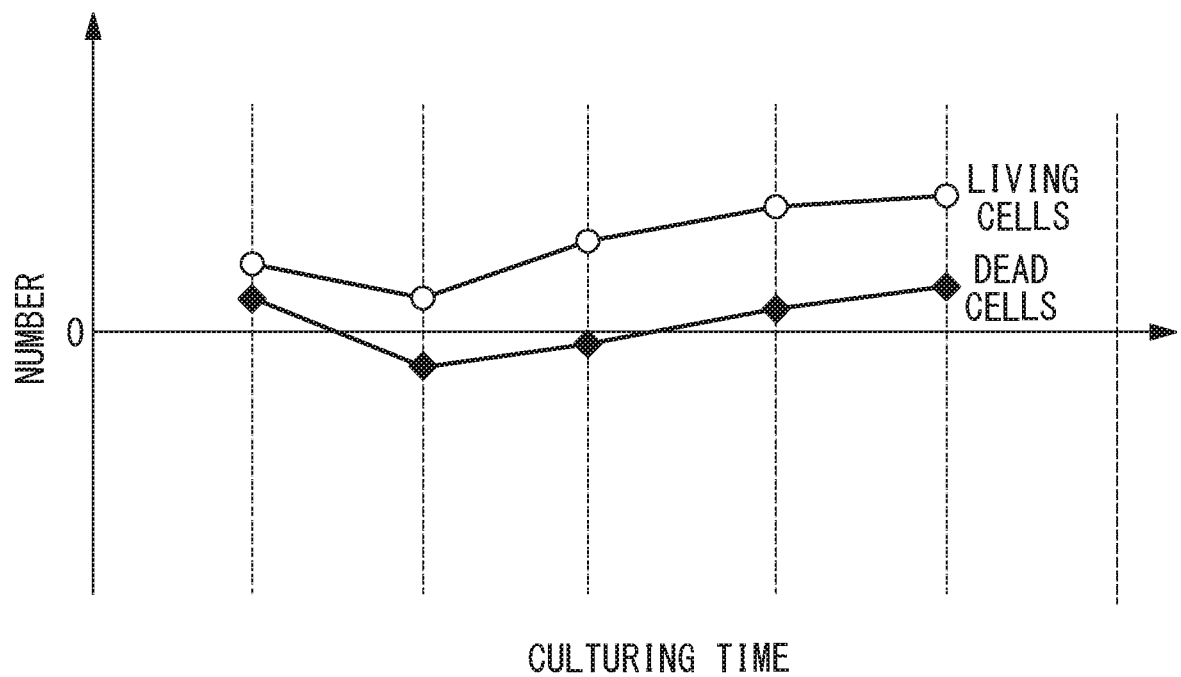
FIG. 14 is a diagram illustrating another example of comparison data generated by the comparison-data generating unit of the image-processing unit in FIG. 9.

The comparison data in FIG. 14 consists of graphs depicting differences over time in the numbers of living cells and dead cells from the immediately previously measured numbers of living cells and dead cells.

Figure 15:
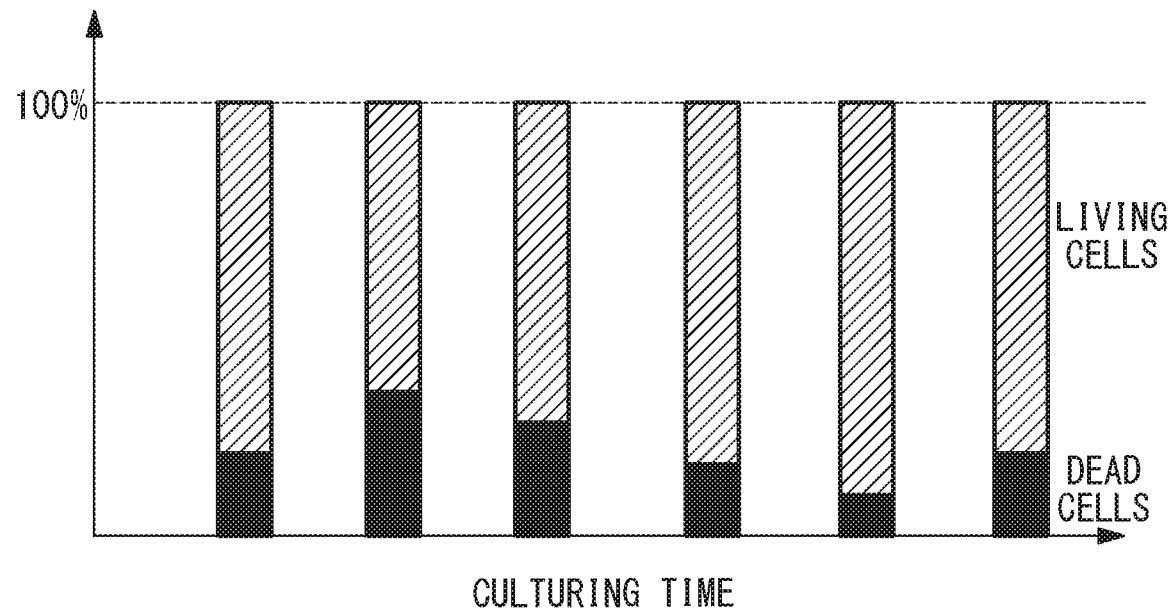
FIG. 15 is a diagram illustrating another example of comparison data generated by the comparison-data generating unit of the image-processing unit in FIG. 9.

The comparison data in FIG. 15 consists of graphs depicting changes over time in the ratio between the number of living cells and the number of dead cells.

Figure 16:
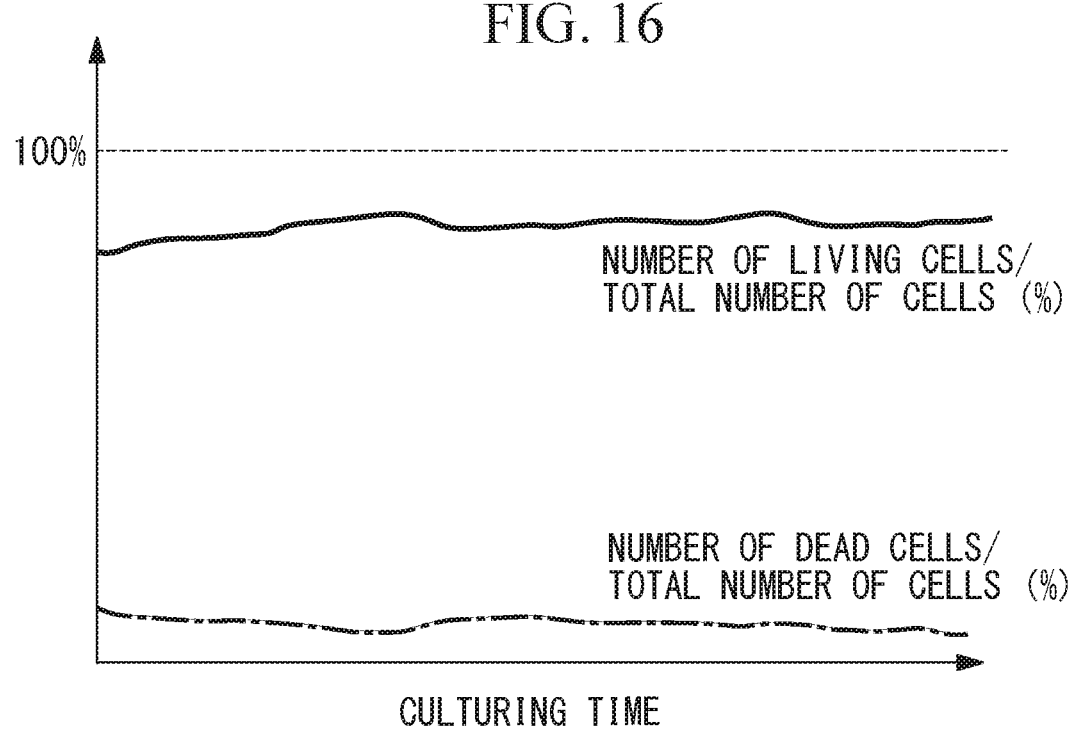
FIG. 16 is a diagram illustrating another example of comparison data generated by the comparison-data generating unit of the image-processing unit in FIG. 9.

The comparison data in FIG. 16 consists of graphs depicting changes over time in the ratio of the number of living cells to the total number of cells and the ratio of the number of dead cells to the total number of cells.

Figure 17:
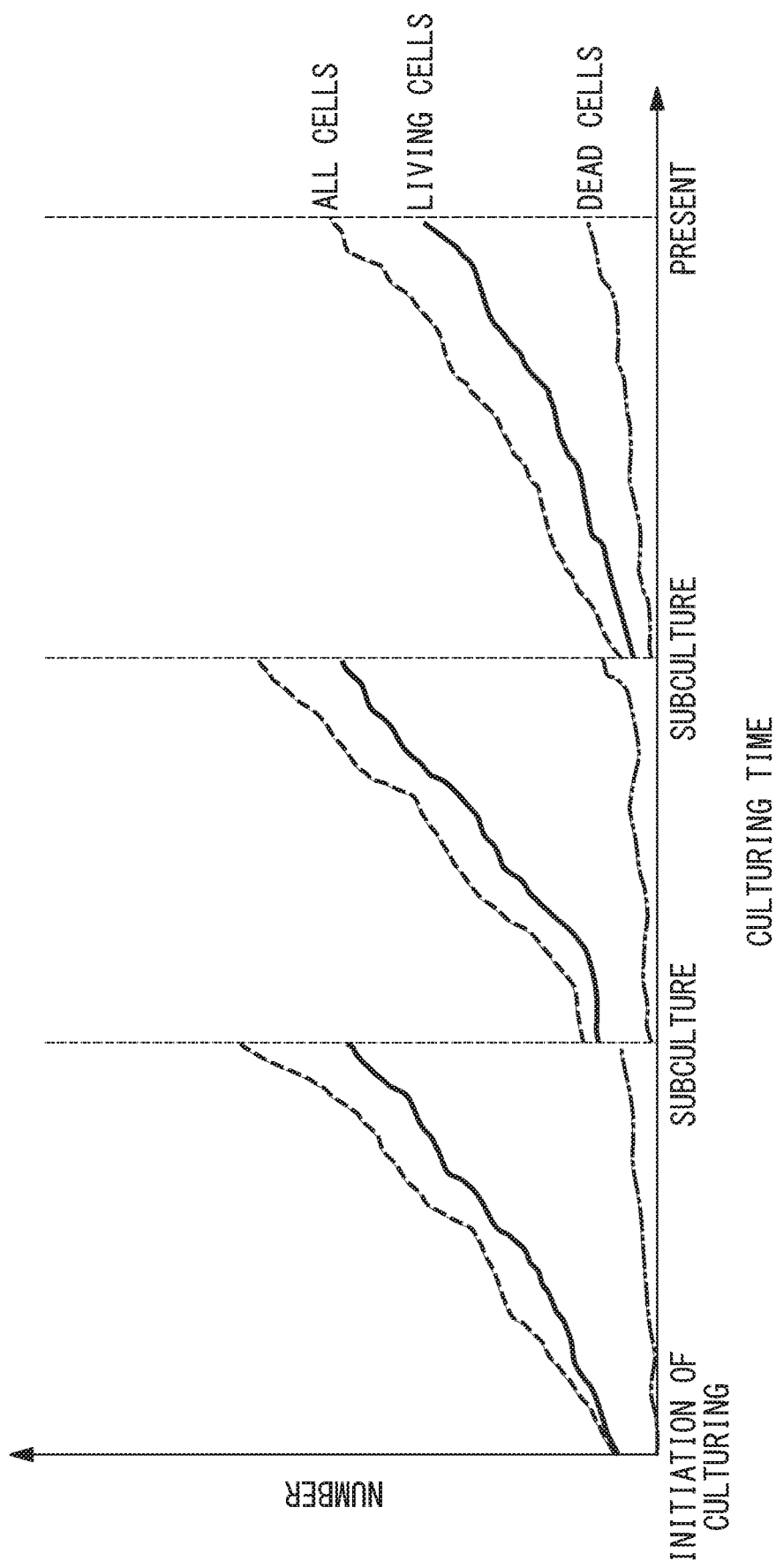
FIG. 17 is a diagram illustrating another example of comparison data generated by the comparison-data generating unit of the image-processing unit in FIG. 9.

The comparison data in FIG. 17 consists of graphs depicting changes over time in the number of living cells, the number of dead cells, and the total number of cells arrayed in time series in the order of subcultures.

Figure 18:
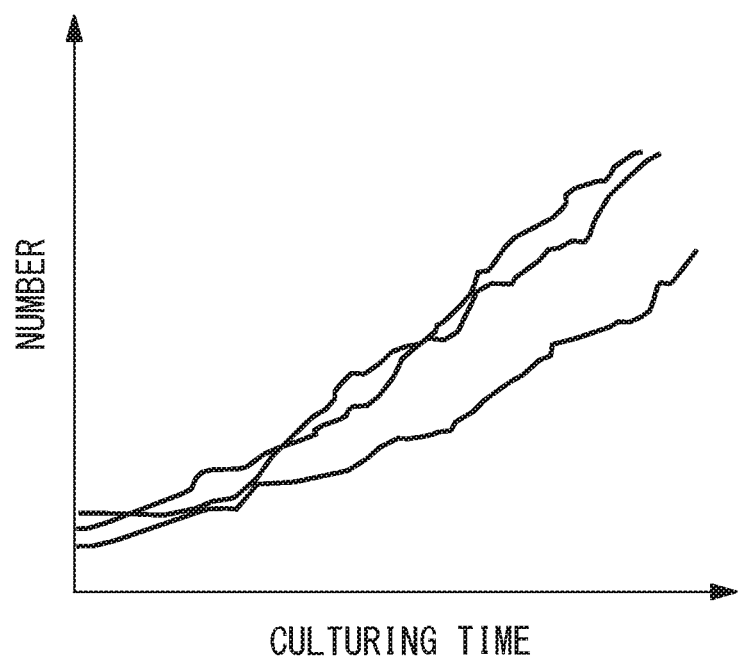
FIG. 18 is a diagram illustrating another example of comparison data generated by the comparison-data generating unit of the image-processing unit in FIG. 9.

In the comparison data in FIG. 18, graphs depicting the changes over time in the number of living cells, the number of dead cells, and the total number of cells in past cultures, and graphs depicting the changes over time in the number of living cells, the number of dead cells, and the total number of cells in the current culture are superposed on each other.

Figure 19:
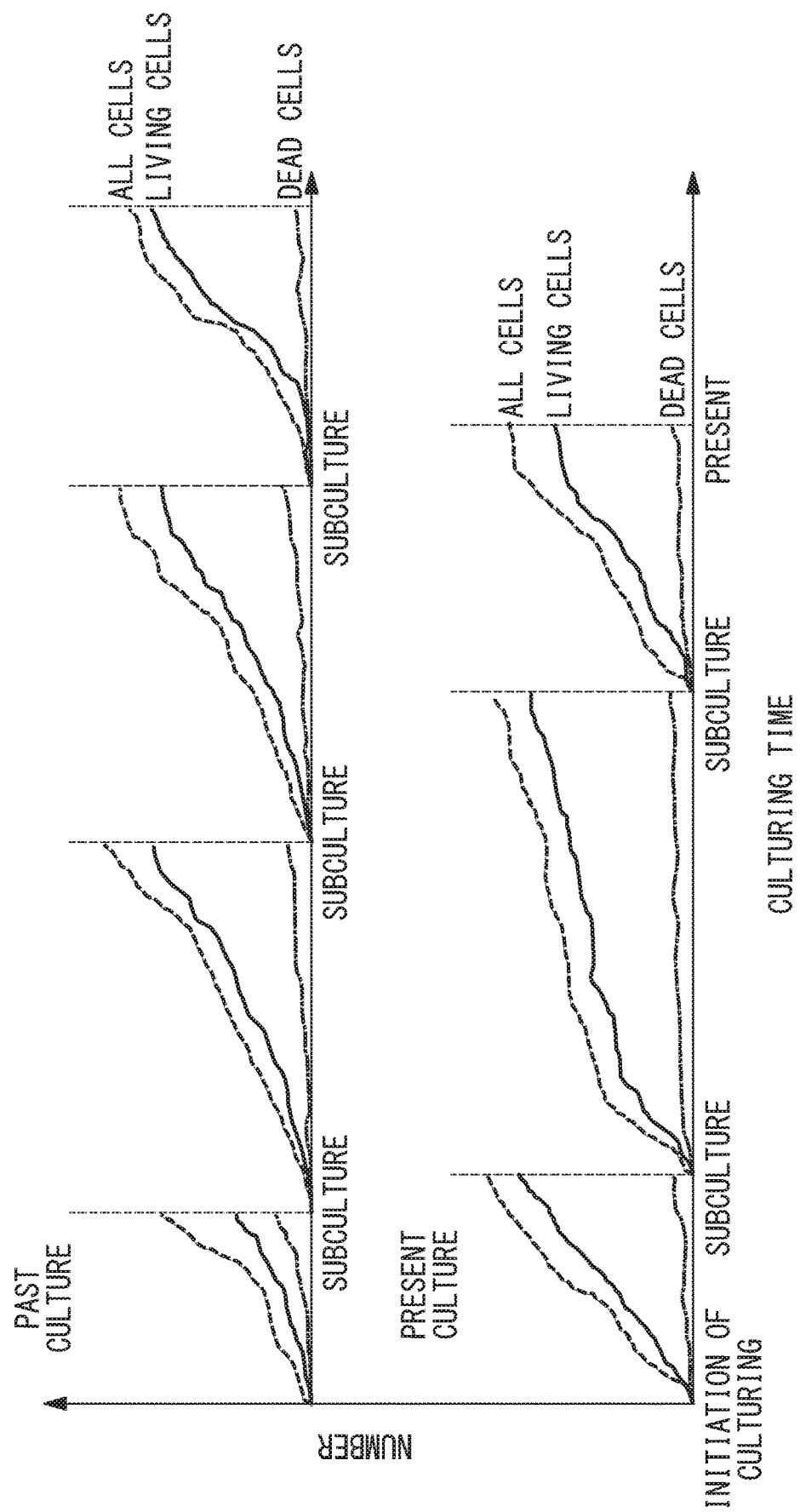
FIG. 19 is a diagram illustrating another example of comparison data generated by the comparison-data generating unit of the image-processing unit in FIG. 9.

In the comparison data in FIG. 19, graphs depicting the changes over time in the number of living cells, the number of dead cells, and the total number of cells in past subcultures and current subcultures are displayed in parallel.

Figure 20:
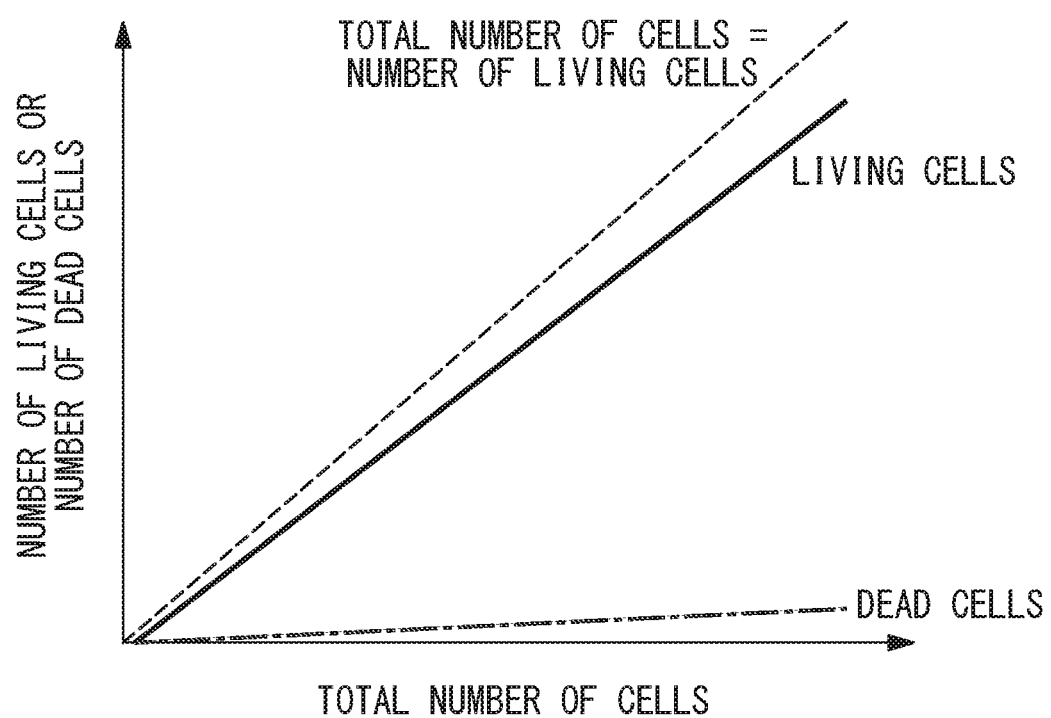
FIG. 20 is a diagram illustrating another example of comparison data generated by the comparison-data generating unit of the image-processing unit in FIG. 9.

The comparison data in FIG. 20 consists of graphs depicting the changes in the number of living cells and the number of dead cells with respect to changes in the total number of cells. The broken line in the figure is a line representing the case where the number of living cells is equal to the total number of cells.

This embodiment may be configured such that a terminal that includes the image-processing unit 12 can be connected to the PC 2 via a network, analysis results can be read out to the terminal by accessing the recording unit 17 from the terminal via the PC 2, and the comparison data can be generated in and displayed on the terminal.

With this configuration, the operator can evaluate the condition of the cells B currently being cultured in a location that is away from the place where the culture observation device 1 is arranged.

Third Embodiment

Next, a cell observation system 300 according to a third embodiment of the present invention will be described while referring to the drawings.

In this embodiment, the parts of the configuration that are different from the first and second embodiments are described, and the parts of the configuration that are common to the first and second embodiments are denoted by the same reference symbols and a description thereof is omitted.

In the second embodiment, it was assumed that the operator evaluates the condition of the cells B on the basis of their current experience and so forth. In contrast, the cell observation system 300 according to this embodiment differs from the second embodiment in that an evaluation result of the cultured cells B is recorded, reference data serving as an evaluation reference for the condition of the cells B is created on the basis of accumulated evaluation results, and the created reference data and quantitative data are displayed so as to allow comparison of the reference data and the quantitative data.

Figure 21:
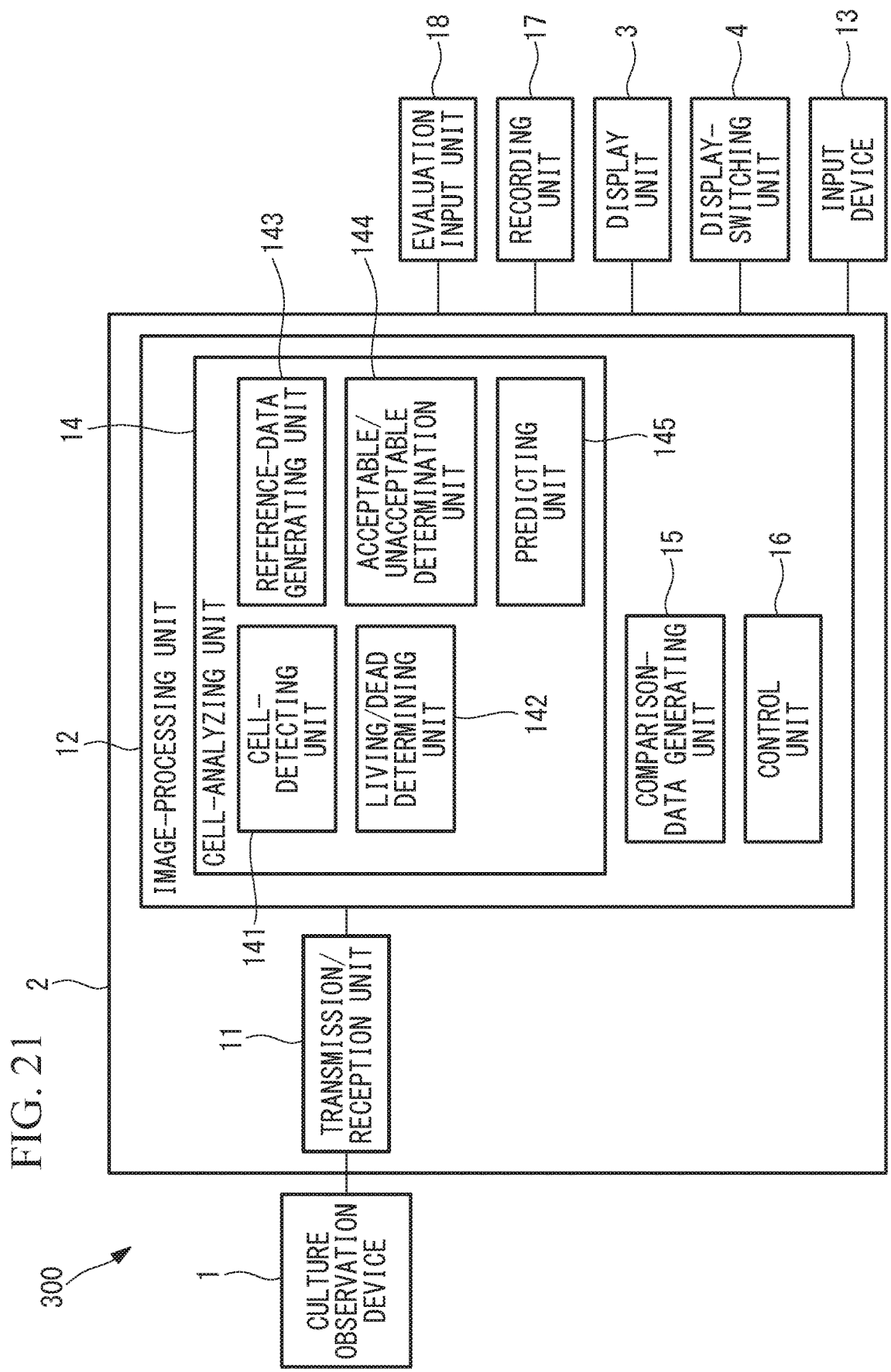
FIG. 21 is a block diagram illustrating the entire configuration of a cell observation system according to a third embodiment of the present invention.

As illustrated in FIG. 21, the cell observation system 300 includes: the culture observation device 1; the PC 2 including the transmission/reception unit 11, the image-processing unit 12, and the input device 13; the display unit 3; the display-switching unit 4; the recording unit 17; and an evaluation input unit 18.

The evaluation input unit 18 is, for example, constituted by the input device 13, and is configured to allow the operator to input an evaluation result for the cultured cells B in association with an identifier. The operator evaluates whether the condition of the cells B is satisfactory or unsatisfactory on the basis of the success or failure of an experiment in which the cultured cells B have been used, and inputs the resulting evaluation result to the evaluation input unit 18. The input evaluation result is transmitted from the PC 2 to the recording unit 17 and is recorded in a database of the recording unit 17 in association with an identifier.

As illustrated in FIG. 22, the operator, the culturing conditions, current and future determination results (described later), and the evaluation results obtained after experiments are recorded in the database of the recording unit 17 in association with each other in addition to the identifiers, photographing initiation dates/times, photographing positions, photographing times, and analysis results of the individual images. The culturing conditions include the type of cell, the temperature and the carbon dioxide concentration inside the incubator 5, the type of culture medium C, and the type of culture vessel A.

The cell-analyzing unit 14 of the image-processing unit 12 further includes a reference-data generating unit 143, an acceptable/unacceptable determination unit 144, and a predicting unit 145 in addition to the cell-detecting unit 141 and the living/dead determining unit 142.

Figure 23:
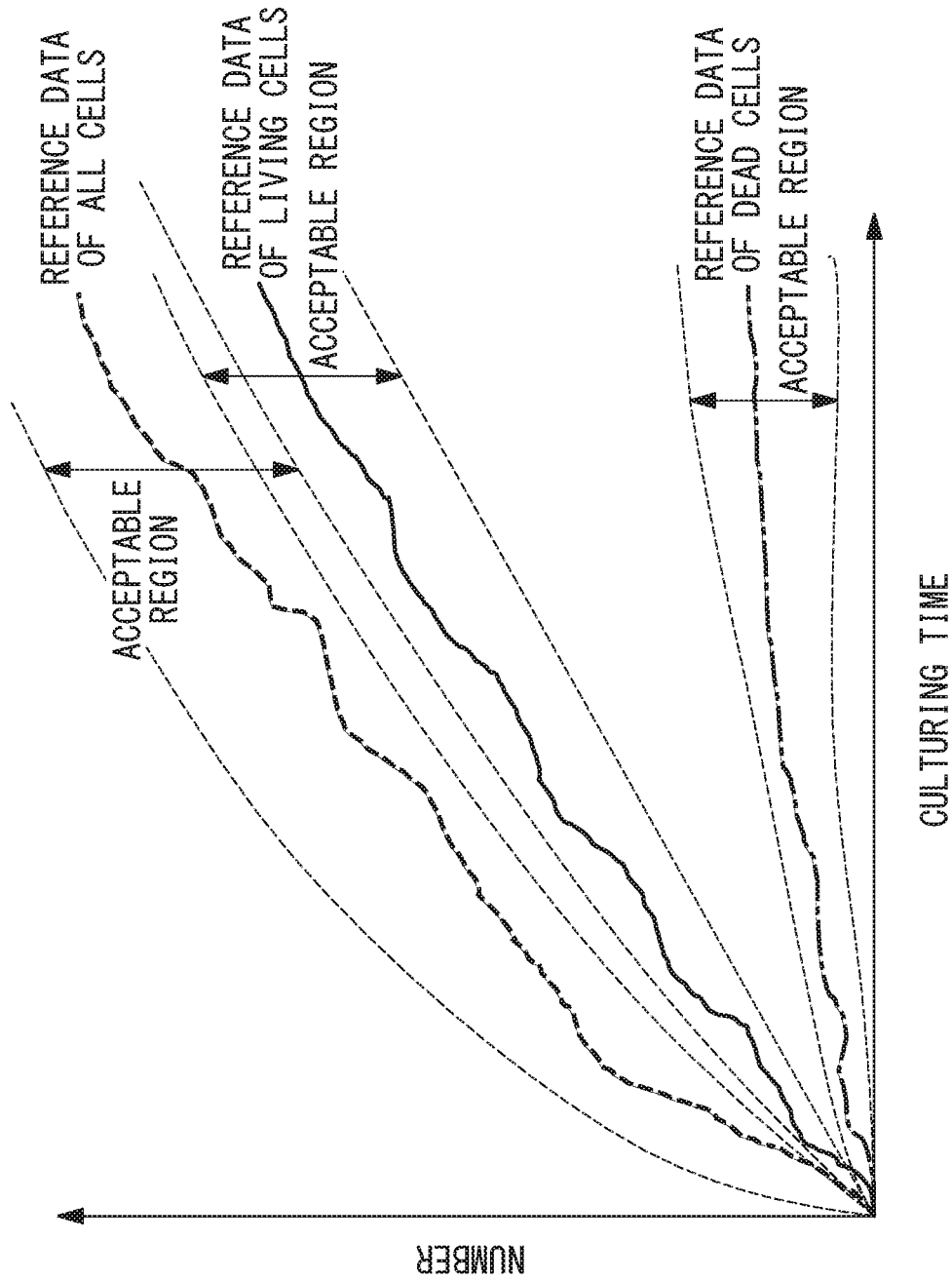
FIG. 23 is a diagram illustrating examples of reference data and acceptable regions.

The reference-data generating unit 143 reads out quantitative data obtained for past cultures recorded in the recording unit 17, and as illustrated in FIG. 23, generates reference data regarding changes over time in the quantitative data of living cells, dead cells, and all the cells from quantitative data of a culture for which an experiment succeeded (that is, the evaluation of the cultured cells B was satisfactory), and generates reference data regarding changes over time in the quantitative data of living cells, dead cells, and all the cells from quantitative data of a culture for which an experiment failed (that is, the evaluation of the cultured cells B was unsatisfactory). The reference data is constituted by any set of quantitative data as it is, or is generated from the arithmetic mean of a plurality of sets of data, a polynomial approximation, a support vector machine (SVM), or deep machine learning, for example.

In addition, the reference-data generating unit 143 determines boundaries between the quantitative data of living cells of a culture for which an experiment succeeded and the quantitative data of living cells of a culture for which an experiment failed, in other words, determines an upper limit and a lower limit for the quantitative data of living cells of the culture for which the experiment succeeded, sets a region interposed between the lower limit and the upper limit as an acceptable region (acceptable range) and sets a region outside the acceptable region as an unacceptable region. Similarly, the reference-data generating unit 143 sets an acceptable region and unacceptable region for the quantitative data of dead cells and an acceptable region and an unacceptable region for the quantitative data of all the cells.

Figure 24A:
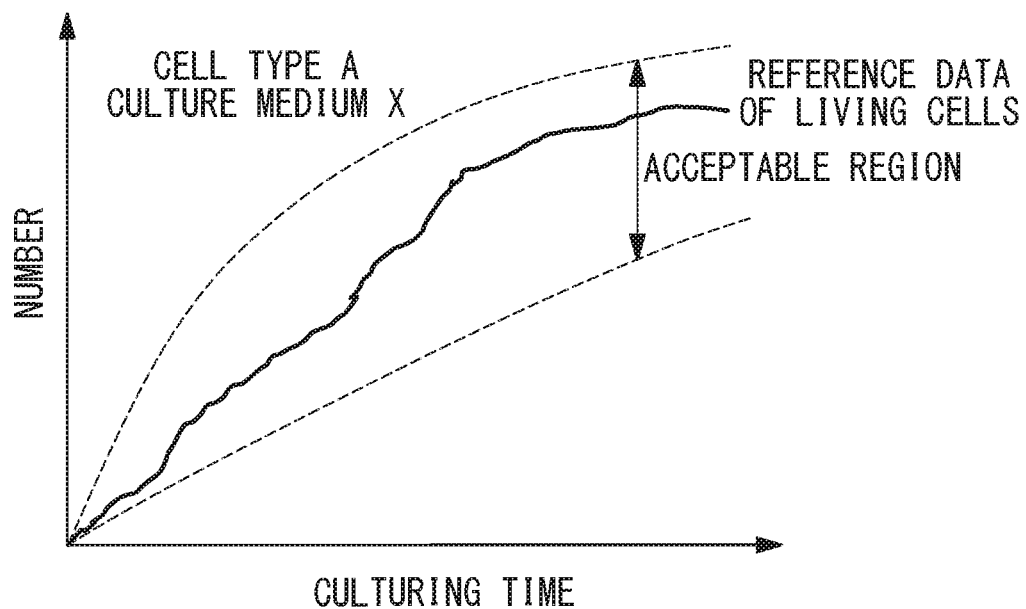
FIG. 24A is a diagram illustrating another example of reference data and acceptable regions.
Figure 24B:
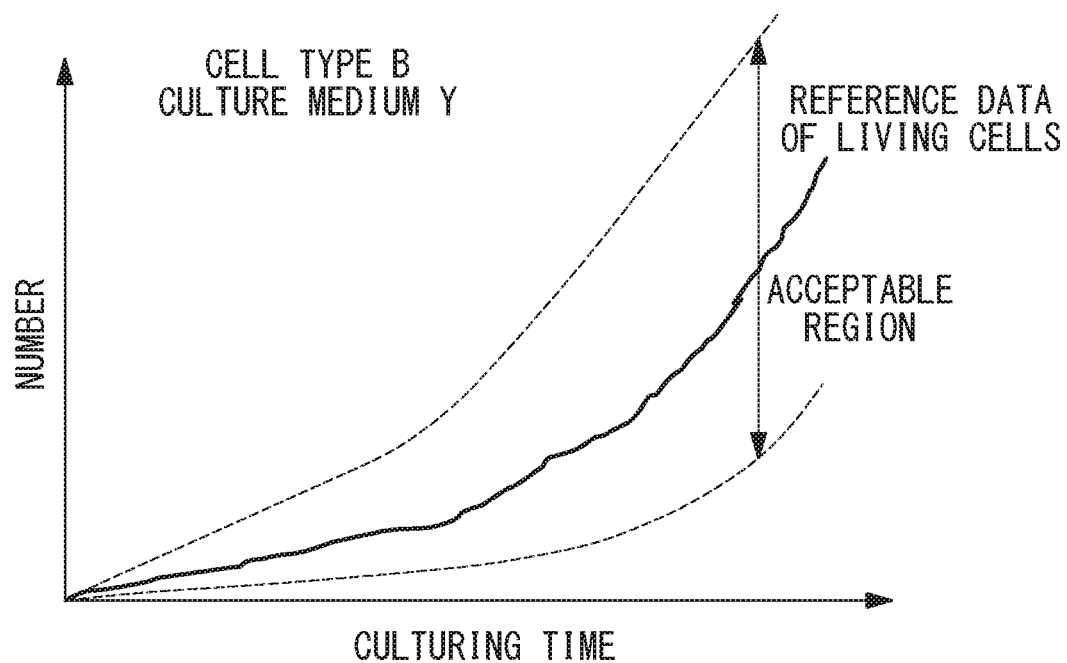
FIG. 24B is a diagram illustrating another example of reference data and acceptable regions.

The growth curves of cells differ depending on the type of cell, and therefore it is preferable that the reference-data generating unit 143 generate reference data and set an acceptable region and an unacceptable region for each type of cell, as illustrated in FIGS. 24A and 24B. Only the reference data, acceptable region, and unacceptable region for living cells are illustrated in FIGS. 24A and 24B.

For example, when evaluation results for cells are newly recorded in the recording unit 17 or upon receiving an instruction from the operator, the reference-data generating unit 143 generates reference data and sets an acceptable region and an unacceptable region, and then records the reference data, the acceptable region, and the unacceptable region in the recording unit 17.

When a new image has been acquired by the culture observation device 1 and current quantitative data has been calculated by the living/dead determining unit 142, the predicting unit 145 reads out the quantitative data of the current culture to date from the recording unit 17 and predicts future quantitative data of living cells, dead cells, and all the cells from the read out quantitative data. For example, the predicting unit 145 predicts quantitative data for a prescribed time after the current time or for the time photographing will be next performed by the culture observation device 1. For example, extrapolation based on a polynomial approximation of a graph of the changes in the quantitative data to date over time or deep machine learning in which a recursive neural network is used based on changes in the quantitative data of past cultures over time is used in the prediction of quantitative data.

When a new image has been acquired by the culture observation device 1 and current quantitative data has been calculated by the living/dead determining unit 142, the acceptable/unacceptable determination unit 144 compares the current quantitative data of the living cells, the dead cells, and all the cells with the respective acceptable regions and unacceptable regions, and makes a determination of acceptable in the case where the current quantitative data is located in the acceptable region and makes a determination of unacceptable in the case where the current quantitative data is located in an unacceptable region.

In addition, the acceptable/unacceptable determination unit 144 receives quantitative data prediction results from the predicting unit 145, compares future quantitative data of living cells, dead cells, and all the cells with the respective acceptable regions and unacceptable regions, and makes a determination of acceptable in the case where the future quantitative data is located in the acceptable region and determines unacceptable in the case where the future quantitative data is located in the unacceptable region.

The current and future determination results generated by the acceptable/unacceptable determination unit 144 are recorded in the database of the recording unit 17.

Figure 25:
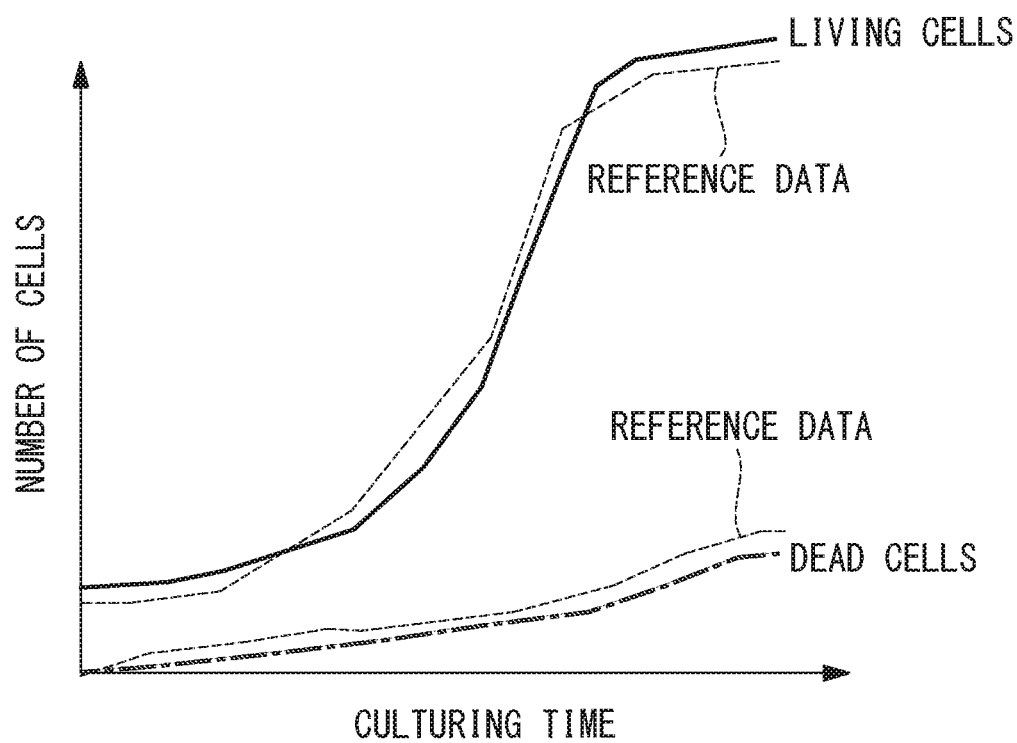
FIG. 25 is a diagram illustrating an example of comparison data generated by a comparison-data generating unit of an image-processing unit in FIG. 21.
Figure 26:
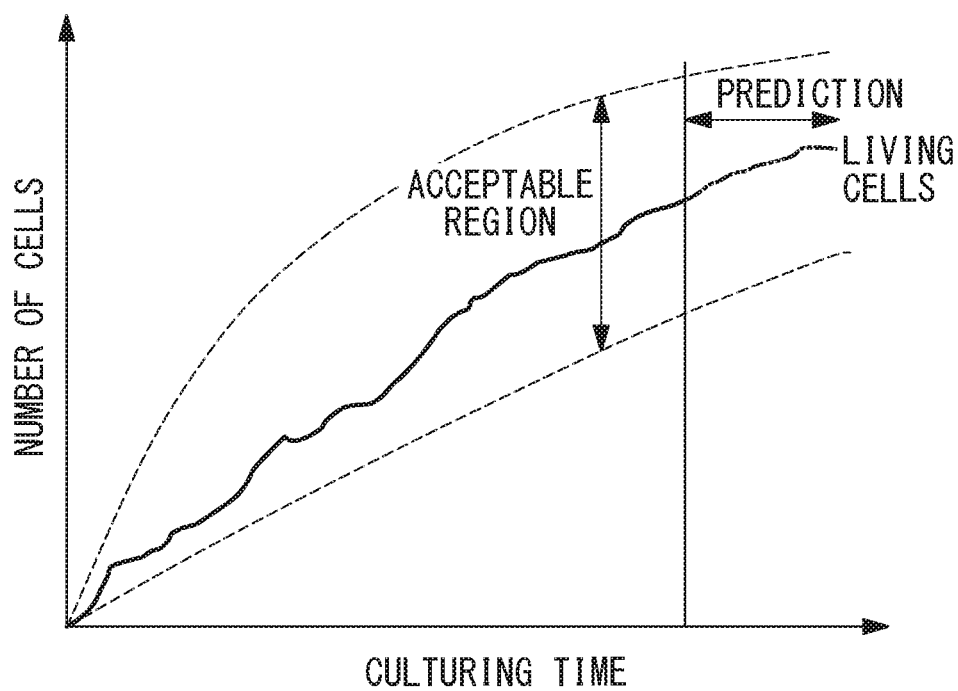
FIG. 26 is a diagram illustrating another example of comparison data generated by the comparison-data generating unit of the image-processing unit in FIG. 21.

The comparison-data generating unit 15 generates display-formatted comparison data that allows comparison of graphs of changes over time in the quantitative data of living cells and dead cells acquired for the current culture and reference data of living cells and dead cells. For example, as illustrated in FIG. 25, the comparison-data generating unit 15 generates comparison data in which graphs of changes over time in the number of living cells and the number of dead cells in the current culture and reference data of living cells and dead cells are superposed with each other. The comparison-data generating unit 15 transmits the generated comparison data to the display unit 3 and causes the generated comparison data to be displayed on the display unit 3. As illustrated in FIG. 26, the comparison-data generating unit 15 may generate comparison data that further includes future quantitative data predicted by the predicting unit 145.

Figure 27:
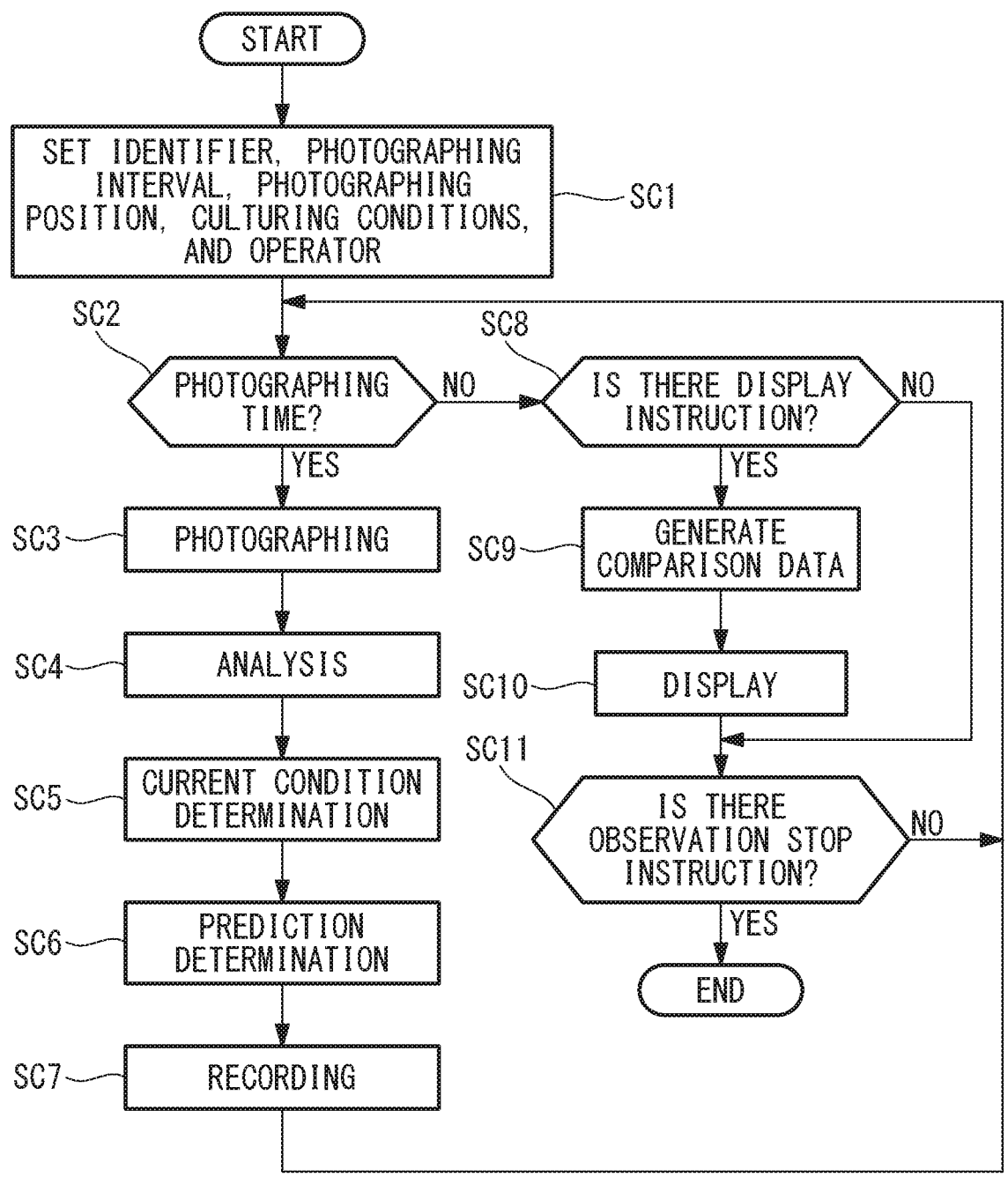
FIG. 27 is a flowchart illustrating the operation of the cell observation system in FIG. 21.

Next, the operation of the thus-configured cell observation system 300 will be described while referring to FIG. 27.

Similarly to the first embodiment, once culturing of the cells B inside the culture vessel A has been initiated, the operator sets an identifier, a photographing interval, a photographing position, culturing conditions, and an operator using the input device 13 (step SC1). The control unit 16 generates a control signal based on the set photographing interval and photographing position, and transmits the control signal to the control unit 10 of the culture observation device 1 via the transmission/reception units 11 and 9.

The control unit 10 causes the light source unit 7 to operate by the set photographing interval (step SC2) and causes the image-capturing element 8b to execute photographing (step SC3). The image acquired by the image-capturing element 8b is transmitted to the image-processing unit 12 inside the PC 2 from the culture observation device 1 via the transmission/reception units 9 and 11. Next, analysis of the image is executed in the cell-analyzing unit 14 of the image-processing unit 12 (step SC4), and the analysis results are recorded in the database of the recording unit 17 in association with the photographing time and the image (step SC7).

Furthermore, the quantitative data of the living cells, the dead cells, and all the cells acquired in step SC4 is compared with the respective reference data, and it is determined whether or not the current condition of the cells B is acceptable (step SC5). In addition, future quantitative data of the living cells, the dead cells, and all the cells is predicted by the predicting unit 145, the predicted quantitative data of the living cells, the dead cells, and all the cells is compared with respective reference data, and it is determined whether or not the future condition of the cells B will be acceptable (step SC6). The determination results obtained in steps SC5 and SC6 are also recorded in the database of the recording unit 17 in association with the photographing time and the image (step SC7).

When the operator wishes to check the condition of the cells B currently being cultured, the operator selects the current culture from the list of cultures displayed on the display unit 3. Once the current culture has been selected by the operator (YES in step SC8), the analysis results of the current culture acquired thus far are read out from the recording unit 17 to the comparison-data generating unit 15, and comparison data that allows changes over time in the quantitative data of the living cells and the dead cells to be compared with each other, and that allows the quantitative data of the living cells and the dead cells to be compared with the respective reference data is generated by the comparison-data generating unit 15 (step SC9). The generated comparison data is displayed on the display unit 3 (step SC10).

On the basis of the comparison data displayed on the display unit 3, the operator evaluates the condition of the cells B currently being cultured inside the culture vessel A and determines whether to continue the culturing (NO in step SC11) or stop the culturing (YES in step SC11), similarly in step SB9 in the second embodiment.

After an experiment has been performed using the cultured cells B, the operator inputs the evaluation results of the cells B based on the success or failure of the experiment in association with the identifier of the culture of cells B that is being evaluated using the evaluation input unit 18. The input evaluation result information is recorded in the database of the recording unit 17 in association with the identifier. The recorded evaluation result information is used when generating new reference data.

According to this embodiment, the following advantages are afforded in addition to the advantages of the first and second embodiments. That is, quantitative data of satisfactory cells for which an experiment was successful and quantitative data of unsatisfactory cells for which an experiment was a failure are accumulated by recording quantitative data of cells cultured in the past in the recording unit 17 in association with evaluation results of the cells based on the success or failure of experiments in which the cells were used. Then, reference data is generated that models the changes over time in the quantitative data of cells for which an experiment was successful and the quantitative data of cells for which an experiment was failed on the basis of the accumulated quantitative data. In the acceptable/unacceptable determination unit 144, the states of current and future cells B are evaluated more accurately by comparing current and future quantitative data with such reference data.

Therefore, the operator can objectively evaluate the condition of the cells B on the basis of the comparison data displayed on the display unit 3 and the determination results generated by the acceptable/unacceptable determination unit 144. In other words, the condition of the cells B can be accurately evaluated even in the case of an inexperienced operator, the occurrence of variations in the evaluation of the condition of the cells B due to different operators can be prevented, and experiments with higher reproducibility can be performed.

From the above-described embodiment, the following invention is also derived.

A first aspect of the present invention provides an image-processing device that includes: a cell-analyzing unit that analyzes an image of the inside of a culture vessel that cultures cells, and acquires quantitative data of living cells and quantitative data of dead cells inside the culture vessel; and a comparison-data generating unit that generates comparison data that allows comparison of the quantitative data of the living cells and the quantitative data of the dead cells acquired by the cell-analyzing unit.

According to this aspect, quantitative data of living cells and quantitative data of dead cells inside the culture vessel are obtained by the cell-analyzing unit through analysis of an image of the inside of the culture vessel, and comparison data that allows comparison of the quantitative data of the living cells and the quantitative data of the dead cells is generated by the comparison-data generating unit.

The condition of the cells being cultured can be easily evaluated by comparing the quantitative data of the living cells and the quantitative data of the dead cells included in the group of cells inside the culture vessel. Therefore, prior to performing an experiment, an operator can evaluate the condition of the cells inside the culture vessel by checking the comparison data, and can then perform an experiment by selecting and using only the cells that are suitable for the experiment. Improvement of the reproducibility of experiments can be supported in this way.

A second aspect of the present invention provides a cell observation system that includes: an image-acquiring unit that acquires an image of the inside of a culture vessel that cultures cells; a cell-analyzing unit that analyzes the image acquired by the image-acquiring unit, and acquires quantitative data of living cells and quantitative data of dead cells inside the culture vessel; a comparison-data generating unit that generates comparison data that allows comparison of the quantitative data of the living cells and the quantitative data of the dead cells acquired by the cell-analyzing unit; and a display unit that displays the comparison data generated by the comparison-data generating unit.

According to this aspect, an image of cells being cultured inside the culture vessel is acquired by the image-acquiring unit, quantitative data of living cells and quantitative data of dead cells inside the culture vessel are obtained by the cell-analyzing unit through analysis of the acquired image, comparison data that allows comparison of the quantitative data of the living cells and the quantitative data of the dead cells is generated by the comparison-data generating unit, and the generated comparison data is displayed on the display unit.

The condition of the cells being cultured can be easily evaluated by comparing the quantitative data of the living cells and the quantitative data of the dead cells included in the group of cells inside the culture vessel. Therefore, prior to performing an experiment, an operator can evaluate the condition of the cells inside the culture vessel by checking the comparison data displayed on the display unit, and can then perform an experiment by selecting and using only the cells that are suitable for the experiment. Improvement of the reproducibility of experiments can be supported in this way.

In the above-described second aspect, the quantitative data may be at least one of a number, a distribution, and a ratio with respect to a total number of cells.

The condition of the cells can be more accurately evaluated on the basis of such quantitative data of living cells and dead cells.

In the above-described second aspect, the comparison-data generating unit may generate a plurality of sets of the comparison data, and the cell observation system may further include a display-switching unit that switches the comparison data displayed on the display unit.

With this configuration, desired comparison data can be selected and displayed on the display unit.

In the above-described second aspect, the cell observation system may further include a recording unit that records the quantitative data acquired by the cell-analyzing unit.

With this configuration, quantitative data analyzed by the cell-analyzing unit and recording on the recording unit can be used in analysis and so forth. In the above-described second aspect, the image-acquiring unit may acquire images of the inside of the culture vessel over time, and the comparison-data generating unit may generate comparison data that allows comparison of changes in the quantitative data of the living cells over time and changes in the quantitative data of the dead cells over time.

The condition of the cells can be more accurately evaluated on the basis of such comparison data.

In the above-described second aspect, the comparison-data generating unit may generate comparison data in which a graph of changes in the quantitative data of the living cells over time and a graph of changes in the quantitative data of the dead cells over time are superposed with each other.

With this configuration, the operator can be provided with comparison data that allows more easy comparison of changes in the quantitative data of living cells over time and changes in the quantitative data of dead cells over time.

In the above-described second aspect, the recording unit may record the quantitative data acquired by the cell-analyzing unit for past cultures, and the comparison-data generating unit may generate comparison data that allows comparison of the quantitative data acquired for different cultures.

With this configuration, it is possible to compare quantitative data acquired for different cultures. For example, quantitative data of cells currently being cultured can be compared with quantitative data acquired for past cultures.

In the above-described second aspect, the recording unit may have reference data of changes in the quantitative data of the living cells over time and reference data of changes in the quantitative data of the dead cells over time for each cell type, and the comparison-data generating unit may generate comparison data that allows comparison of a graph of changes in the quantitative data of the living cells over time and the reference data of the living cells, and that allows comparison of a graph of changes in the quantitative data of the dead cells over time and the reference data of the dead cells.

With this configuration, the operator is able to more objectively evaluate the condition of the cells on the basis of a comparison of changes in the respective quantitative data of the living cells and the dead cells over time, and the reference data.

In the above-described second aspect, the reference data may include a lower limit and an upper limit set for the quantitative data of the living cells, and a lower limit and an upper limit set for the quantitative data of the dead cells, and the cell-analyzing unit may compare the quantitative data of the living cells with the lower limit and the upper limit therefor, may compare the quantitative data of the dead cells and the lower limit and the upper limit therefor, and may determine whether or not the condition of the cells is acceptable on the basis of results of the comparisons.

With this configuration, the operator is able to more objectively evaluate the condition of the cells on the basis of an acceptable/unacceptable determination result made by the cell-analyzing unit.

In the above-described second aspect, the comparison-data generating unit may display an acceptable range defined by the lower limit and the upper limit for the quantitative data of the living cells and an acceptable range defined by the lower limit and the upper limit for the quantitative data of the dead cells.

With this configuration, the operator is able to more objectively evaluate the condition of the cells on the basis of a comparison between the quantitative data of the living cells and the dead cells and the respective acceptable ranges.

In the above-described second aspect, the cell observation system may further include an evaluation input unit that allows an operator to input evaluation results of cultured cells, and the recording unit may record the evaluation results input to the evaluation input unit in association with the quantitative data acquired by the cell-analyzing unit for a cell culture that is being evaluated.

After an experiment has been performed using the cultured cells, a final evaluation of the condition of the cells is obtained on the basis of the results of the experiment. Information relating to the correlation between evaluation results and quantitative data of cells is accumulated in the recording unit by recording the evaluation results in association with the quantitative data. The operator is able to more accurately evaluate the condition of the cells currently being cultured from the quantitative data by referring to the accumulated information.

In the above-described second aspect, the cell-analyzing unit may determine whether or not the condition of the cells inside the culture vessel is acceptable on the basis of comparison of current quantitative data of cells inside the culture vessel and quantitative data acquired for past cultures recorded in the recording unit in association with the evaluation results.

A determination as to whether or not the condition of the cells currently being cultured is acceptable can be more accurately made by referring to quantitative data and evaluation results acquired for past cultures.

In the above-described second aspect, the cell observation system may further include a reference-data generating unit that generates reference data of the living cells and reference data of the dead cells for each evaluation result from the quantitative data of the living cells and the quantitative data of the dead cells acquired for past cultures recorded in the recording unit, and the recording unit may record the reference data generated by the reference-data generating unit.

With this configuration, reference data is generated from quantitative data when the condition of the cells is satisfactory and from quantitative data when the condition of the cells is unsatisfactory from among quantitative data acquired for past cultures. The condition of the cells can be evaluated more accurately by comparing the quantitative data of the current culture with such reference data.

In the above-described second aspect, the cell-analyzing unit may predict future quantitative data of the living cells on the basis of current quantitative data of the living cells, may predict future quantitative data of the dead cells on the basis of current quantitative data of the dead cells, may compare the predicted future quantitative data of the living cells and the dead cells with the lower limits and upper limits therefor, and may determine whether or not the condition of the cells is acceptable on the basis of results of the comparison.

With this configuration, the operator is able to determine whether to continue the culturing operation on the basis of the results of predicting whether the condition of the cells will be acceptable in the future.

REFERENCE SIGNS LIST 100, 200, 300 cell observation system
1 culture observation device
2 personal computer (PC)
3 display unit
4 display-switching unit
12 image-processing unit (image-processing device)
13 input device
14 cell-analyzing unit
141 cell-detecting unit
142 living/dead determining unit
143 reference-data generating unit
144 acceptable/unacceptable determination unit
145 predicting unit
15 comparison-data generating unit
16 control unit
17 recording unit
18 evaluation input unit

The invention claimed is:
1. A cell observation system comprising:
a culture observation device that acquires, images of cells being cultured inside a culture vessel;

a computer that is configured to perform steps (i)-(iii), in order, a plurality of times:
(i) acquire an image;
(ii) analyze the image acquired by the culture observation device, and acquire quantitative data of living cells and quantitative data of dead cells inside the culture vessel; and
(iii) record the acquired quantitative data of living cells and quantitative data of dead cells in a database;
and, the computer further configured to
generate comparison data that allows comparison of changes in the acquired quantitative data of the living cells and changes in the acquired quantitative data of the dead cells; and
a monitor that displays the generated comparison data.

2. The cell observation system according to claim 1, further comprising a recording device that records the acquired quantitative data.

3. The cell observation system according to claim 2, wherein the recording device records the acquired quantitative data for past cultures, and
the computer is configured to generate comparison data that allows comparison of the quantitative data acquired for different cultures.

4. The cell observation system according to claim 2, wherein the recording device has reference data of changes in the quantitative data of the living cells over time and reference data of changes in the quantitative data of the dead cells over time for each cell type, and
the computer is configured to generate comparison data that allows comparison of a graph of changes in the quantitative data of the living cells over time and the reference data of the living cells, and that allows comparison of a graph of changes in the quantitative data of the dead cells over time and the reference data of the dead cells.

5. The cell observation system according to claim 4, wherein the computer is configured to generate reference data of the living cells and reference data of the dead cells for each evaluation result from the quantitative data of the living cells and the quantitative data of the dead cells acquired for past cultures recorded in the recording device, and
the recording device records the generated reference data.

6. The cell observation system according to claim 2, further comprising an input device that allows an operator to input evaluation results of cultured cells,
wherein the recording device records the evaluation results input to the input device in association with the acquired quantitative data for a cell culture that is being evaluated.

7. The cell observation system according to claim 6, wherein the computer is configured to determine whether or not a condition of the cells inside the culture vessel is acceptable on a basis of comparison of current quantitative data of cells inside the culture vessel and quantitative data acquired for past cultures recorded in the recording device in association with the evaluation results.

8. The cell observation system according to claim 1, wherein the computer is configured to generate comparison data in which a graph of changes in the quantitative data of the living cells over time and a graph of changes in the quantitative data of the dead cells over time are superposed with each other.

9. The cell observation system according to claim 1, wherein the culture vessel is a flask or a multiwell plate.

10. The cell observation system according to claim 1, wherein the images of the cells being cultured are acquired in an incubator.

11. A cell observation system comprising:
a culture observation device that acquires an image of inside of a culture vessel that cultures cells;
a computer that is configured to:
analyze the image acquired by the culture observation device, and acquire quantitative data of living cells and quantitative data of dead cells inside the culture vessel; and
generate comparison data that allows comparison of the acquired quantitative data of the living cells and the acquired quantitative data of the dead cells;
a monitor that displays the generated comparison data; and
a recording device that records the acquired quantitative data,
wherein the recording device has reference data of changes in the quantitative data of the living cells over time and reference data of changes in the quantitative data of the dead cells over time for each cell type,
the computer is configured to generate comparison data that allows comparison of a graph of changes in the quantitative data of the living cells over time and the reference data of the living cells, and that allows comparison of a graph of changes in the quantitative data of the dead cells over time and the reference data of the dead cells,
the reference data includes a lower limit and an upper limit set for the quantitative data of the living cells, and a lower limit and an upper limit set for the quantitative data of the dead cells, and
the computer is configured to compare the quantitative data of the living cells with the lower limit and the upper limit therefor, compare the quantitative data of the dead cells with the lower limit and the upper limit therefor, and determine whether or not a condition of the cells is acceptable on a basis of results of the comparisons.

12. The cell observation system according to claim 11, wherein the computer is configured to display an acceptable range defined by the lower limit and the upper limit for the quantitative data of the living cells and an acceptable range defined by the lower limit and the upper limit for the quantitative data of the dead cells.

13. The cell observation system according to claim 11, wherein the computer is configured to predict future quantitative data of the living cells on a basis of current quantitative data of the living cells, predict future quantitative data of the dead cells on a basis of current quantitative data of the dead cells, compare the predicted future quantitative data of the living cells and the dead cells with the lower limits and upper limits therefor, and determine whether or not a condition of the cells is acceptable on a basis of results of comparisons.

14. A non-transitory computer-readable medium having a program stored therein, the program causing a computer to:
perform steps (i)-(iii), in order, a plurality of times,
(i) acquiring an image;
(ii) analyzing the image of cells being cultured inside a culture vessel, the image being acquired over time, and acquiring quantitative data of living cells and quantitative data of dead cells inside the culture vessel;
(iii) recording the acquired quantitative data of living cells and quantitative data of dead cells in a database,
the program causing the computer to also generate comparison data that allows comparison of changes in the acquired quantitative data of the living cells over time and changes in the acquired quantitative data of the dead cells over time; and output the generated comparison data to be displayed.

\* \* \* \* \*